United States Patent
Lee et al.

(10) Patent No.: US 12,513,548 B2
(45) Date of Patent: *Dec. 30, 2025

(54) RADIO LINK MONITORING WITHOUT ALWAYS-ON REFERENCE SIGNALS

(71) Applicant: Qualcomm Incorporated, San Diego, CA (US)

(72) Inventors: Heechoon Lee, San Diego, CA (US); Tao Luo, San Diego, CA (US); Wanshi Chen, San Diego, CA (US); Krishna Kiran Mukkavilli, San Diego, CA (US); Joseph Binamira Soriaga, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/551,839

(22) Filed: Dec. 15, 2021

(65) Prior Publication Data

US 2022/0110014 A1 Apr. 7, 2022

Related U.S. Application Data

(63) Continuation of application No. 16/489,760, filed as application No. PCT/US2018/021892 on Mar. 10, (Continued)

(51) Int. Cl.
*H04W 24/00* (2009.01)
*H04B 17/00* (2015.01)
(Continued)

(52) U.S. Cl.
CPC ............ *H04W 24/10* (2013.01); *H04B 17/00* (2013.01); *H04B 17/309* (2015.01);
(Continued)

(58) Field of Classification Search
CPC . H04W 52/0216; H04W 76/28; H04B 17/309
See application file for complete search history.

(56) References Cited

U.S. PATENT DOCUMENTS 10,327,170 B2 6/2019 Lee et al.
11,228,932 B2 * 1/2022 Lee ........................... H04L 5/00
(Continued)

FOREIGN PATENT DOCUMENTS

GB 2507570 A 5/2014
JP 2012503450 A 2/2012
(Continued)

OTHER PUBLICATIONS

CMCC: "Discussion on Discovery Signal Design for Laa," 3GPP Draft; R1-155786, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015, Oct. 4, 2015 (Oct. 4, 2015), XP051039753, 4 Pages, Retrieved from the Internet: URL: http://www.3gpp.org/ftp/Meetings_3GPP_SYNC/RAN1/Docs/ [retrieved on Oct. 4, 2015].

(Continued)

*Primary Examiner* — Brandon M Renner
(74) *Attorney, Agent, or Firm* — Holland & Hart LLP

(57) ABSTRACT

Methods, systems, and devices for wireless communication are described. A discontinuous reception (DRX) periodicity may be configured to enable monitoring of a reference signal (RS) for RLM procedures. For example, a transmitting device may configure a DRX periodicity for an RS, where the configured DRX periodicity may include a periodicity of discrete transmissions of the RS or a periodicity of a transmission window in which the RS is located. Accordingly, a receiving device may identify the DRX periodicity and monitor radio link quality using the RS based on the DRX periodicity. In some examples, the RS may be trans- (Continued)

mitted independent of control channel transmissions, and the transmitting device may configure one or more control resource sets for the RS.

1 Claim, 19 Drawing Sheets

Related U.S. Application Data 2018, now Pat. No. 11,228,932, which is a continuation of application No. 15/917,553, filed on Mar. 9, 2018, now Pat. No. 10,327,170.

(60) Provisional application No. 62/470,862, filed on Mar. 13, 2017.

(51) Int. Cl.
| | | |
|---|---|---|
| *H04B 17/309* | (2015.01) | |
| *H04B 17/336* | (2015.01) | |
| *H04L 5/00* | (2006.01) | |
| *H04W 24/10* | (2009.01) | |
| *H04W 52/02* | (2009.01) | |
| *H04W 76/28* | (2018.01) | |
| *H04L 1/00* | (2006.01) | |

(52) U.S. Cl.
CPC ............ *H04B 17/336* (2015.01); *H04L 5/00* (2013.01); *H04L 5/0048* (2013.01); *H04L 5/006* (2013.01); *H04L 5/0082* (2013.01); *H04W 52/0216* (2013.01); *H04W 76/28* (2018.02); *H04L 1/00* (2013.01); *H04L 5/0023* (2013.01); *H04L 5/0091* (2013.01)

(56) References Cited

U.S. PATENT DOCUMENTS

| | | | |
|---|---|---|---|
| 2010/0014429 A1 | 1/2010 | Kim et al. | |
| 2010/0113008 A1 | 5/2010 | Wang et al. | |
| 2010/0137013 A1 | 6/2010 | Ren | |
| 2011/0158188 A1 | 6/2011 | Womack et al. | |
| 2011/0205948 A1 | 8/2011 | Chen et al. | |
| 2013/0010778 A1 | 1/2013 | Abdel-Kader et al. | |
| 2013/0107782 A1 | 5/2013 | Anas et al. | |
| 2013/0279353 A1 | 10/2013 | Ji et al. | |
| 2014/0009876 A1 | 1/2014 | Wang | |
| 2014/0098761 A1 | 4/2014 | Lee et al. | |
| 2014/0204781 A1 | 7/2014 | Horvat et al. | |
| 2014/0269368 A1 | 9/2014 | Xu et al. | |
| 2014/0307560 A1* | 10/2014 | Kim ................... | H04L 1/0045 370/241 |
| 2015/0103768 A1* | 4/2015 | Chen ................. | H04W 72/1273 370/329 |
| 2015/0327325 A1 | 11/2015 | Koivisto et al. | |
| 2016/0066255 A1 | 3/2016 | Marinier et al. | |
| 2016/0242231 A1 | 8/2016 | Vajapeyam et al. | |
| 2016/0330680 A1* | 11/2016 | Yi ................... | H04W 36/00692 |
| 2017/0048772 A1* | 2/2017 | Gheorghiu ............ | H04L 5/0007 |
| 2017/0303240 A1* | 10/2017 | Basu Mallick ....... | H04W 72/12 |
| 2020/0245172 A1 | 7/2020 | Lee et al. | |
| 2020/0305094 A1* | 9/2020 | Ouchi ................. | H04W 52/325 |

FOREIGN PATENT DOCUMENTS

| | | |
|---|---|---|
| KR | 20110063553 A | 6/2011 |
| WO | WO2015115986 A1 | 8/2015 |
| WO | WO-2016071010 A1 | 5/2016 |
| WO | WO2016164077 A1 | 10/2016 |
| WO | WO2017050512 A1 | 3/2017 |
| WO | WO-2017147549 A1 | 8/2017 |
| WO | WO-2018169808 | 9/2018 |

OTHER PUBLICATIONS

Intel Corporation: "Discussion on RRM Impacts of LAA," 3GPP Draft; R4-154153 LAA RRM, 3rd Generation Partnership Project (3GPP), Mobile Competence Centre; 650, Route Des Lucioles; F-06921 Sophia-Antipolis Cedex; France, vol. RAN WG4, No. Beijing, China; Aug. 24, 2015-Aug. 28, 2015, Aug. 23, 2015 (Aug. 23, 2015), XP051007856, 6 pages, Retrieved from the Internet: URL: http://www.3gpp.org/ftp/Meetings_3GPP_SYNC/RAN4/ Docs/ [retrieved on Aug. 23, 2015].
International Search Report and Written Opinion—PCT/US2018/ 021892—ISA/EPO—Sep. 24, 2018.
LG Electronics: "Discussion on RRM Measurement in NR", 3GPP Draft, 3GPP TSG RAN WG1 Meeting #88, R1-1702443, Athens, Greece Feb. 13-17, 2017, 6 Pages.
NTT Docomo Inc: "Status Report of Study on New Radio Access Technology", 3GPP TSG RAN Meeting #75, RP-170376, Dubrovnik, Croatia, Mar. 6, 2017-Mar. 9, 2017, Mar. 9, 2017 (Mar. 9, 2017), pp. 1-157, 20170228.
Partial International Search Report—PCT/US2018/021892—ISA/ EPO—Jun. 26, 2018.
Qualcomm Incorporated: "Radio Link Monitoring Consideration", 3GPP Draft, 3GPP TSG-RAN WG1 #89, R1-1708578, Hangzhou, P.R. China May 15-19, 2017, pp. 1-3.
Qualcomm Incorporated: "Radio Link Monitoring Consideration", 3GPP Draft, 3GPP TSG-RAN WG1 #93, R1-1807335, Busan, Korean, May 21-25, 2018, pp. 1-2.
Qualcomm Incorporated: "Radio Link Monitoring Consideration", 3GPP Draft, 3GPP TSG-RAN WG1 NR#2, R1-1711151, Qingdao, P.R. China Jun. 27-30, 2017, pp. 1-5.
Taiwan Search Report—TW107108268—TIPO—Sep. 16, 2019.
ZTE: "Considerations on SCE RRM Core Requirements Simulation Assumptions", 3GPP TSG-RAN WG4 Meeting #71 RRM AH, 3GPP Draft, R4-71AH-0081-RRM_ANALYSIS_V2, 3rd Generation Partnership Project (3GPP), Mobile Competence Centre, 650, Route Des Lucioles, F-06921 Sophia-Antipolis Cedex, France, vol. RAN WG4, No. Beijing, P.R. China, Jun. 18, 2014 (Jun. 18, 2014), XP050826495, 8 Pages, Retrieved from the Internet: URL: http:// www.3gpp.org/ftp/tsg_ran/WG4_Radio/TSGR4_AHs/TSGR4_AH_ Rel-12-RRM_June2014/Docs/ [retrieved on Jun. 18, 2014].
Alcatel-Lucent: "Discussion of the RS for Additional Carrier Types for Carrier Aggregation Enhancement ", 3GPP TSG-RAN WG4 Meeting #63, R4-122883, Prague, CZ, Apr. 21-25, 2012, pp. 1-3.
Huawei, et al., "LAA/eLAA ad Hoc Minutes", 3GPP Draft; R4-162722, 3rd Generation Partnership Project, Mobile Competence Centre, 650, Route Des Lucioles, F-06921, Sophia-Antipolis Cedex, France, vol. RAN WG4, No. San Jose del Cabo, Mexico; Apr. 20, 2016, XP051094482, 11 Pages.

* cited by examiner

RADIO LINK MONITORING WITHOUT ALWAYS-ON REFERENCE SIGNALS

CROSS REFERENCES AND PRIORITY CLAIM

The present application for Patent is a Continuation of U.S. patent application Ser. No. 16/489,760 by Lee et al., entitled "RADIO LINK MONITORING WITHOUT ALWAYS-ON REFERENCE SIGNALS" filed Aug. 29, 2019, which is a 371 national phase filing of International Application No. PCT/US2018/021892 by Lee et al., entitled "RADIO LINK MONITORING WITHOUT ALWAYS-ON REFERENCE SIGNALS" filed Mar. 10, 2018, which claims priority to U.S. patent application Ser. No. 15/917,553 by Lee et al., entitled "RADIO LINK MONITORING WITHOUT ALWAYS-ON REFERENCE SIGNALS" filed Mar. 9, 2018, which claims priority to U.S. Provisional Patent Application No. 62/470,862 by Lee, et al., entitled "RADIO LINK MONITORING WITHOUT ALWAYS-ON REFERENCE SIGNALS" filed Mar. 13, 2017, each of which is assigned to the assignee hereof and incorporated by reference herein in its entirety.

INTRODUCTION

The following relates generally to wireless communication, and more specifically to radio link monitoring (RLM) without always-on reference signals (RSs). Certain embodiments enable and provide communication devices, methods, systems, and techniques with improved connection reliability and power efficient usage.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Receiving devices (e.g., UEs) in some wireless communications systems may monitor radio link quality to determine synchronicity when communicating with a transmitting device (e.g., a base station, another UE, etc.) and identify radio link failures. In such cases, the receiving device may use a quality of an always-on transmission of certain RSs to perform radio link quality measurements. However, some systems may not use always-on transmissions of these RSs, and efficient techniques for radio link monitoring may be desirable to ensure robust communications.

SUMMARY

The described techniques relate to improved methods, systems, devices, or apparatuses that support RLM without always-on RSs. Generally, the described techniques provide for the use of a discontinuous reception (DRX) periodicity to enable monitoring of an RS used for RLM procedures associated with a downlink control channel. For example, a transmitting device (e.g., a base station) may configure a DRX periodicity for an RS, where the configured DRX periodicity may include a periodicity of discrete transmissions of the RS or a periodicity of a transmission window in which the RS is located (e.g., within at least one transmission time interval (TTI) of respective transmission windows). Accordingly, a receiving device (e.g., a UE) may identify the DRX periodicity and monitor radio link quality using the RS based on the DRX periodicity. In some examples, the RS may be transmitted independent of control channel transmissions, and the transmitting device may configure one or more control resource sets for the RS. Additionally, the receiving device may opportunistically monitor radio link quality independent of the configured DRX periodicity associated with the RS (e.g., the receiving device may monitor radio link quality outside of the configured discrete transmissions or transmission windows).

A method of wireless communication is described. The method may include identifying a DRX periodicity for an RS for RLM procedures, monitoring, based at least in part on the identified DRX periodicity of the RS, a radio link quality, and receiving the RS according to the DRX periodicity.

An apparatus for wireless communication is described. The apparatus may include means for identifying a DRX periodicity for an RS for RLM procedures, means for monitoring, based at least in part on the identified DRX periodicity of the RS, a radio link quality, and means for receiving the RS according to the DRX periodicity.

Another apparatus for wireless communication is described. The apparatus may include a processor, memory in electronic communication with the processor, and instructions stored in the memory. The instructions may be operable to cause the processor to identify a DRX periodicity for an RS for RLM procedures, monitor, based at least in part on the identified DRX periodicity of the RS, a radio link quality, and receive the RS according to the DRX periodicity.

A non-transitory computer-readable medium for wireless communication is described. The non-transitory computer-readable medium may include instructions operable to cause a processor to identify a DRX periodicity for an RS for RLM procedures, monitor, based at least in part on the identified DRX periodicity of the RS, a radio link quality, and receive the RS according to the DRX periodicity.

Some examples of the method, apparatus, and non-transitory computer-readable medium described above may further include processes, features, means, or instructions for determining a periodicity of discrete transmissions of the RS. Some examples of the method, apparatus, and non-transitory computer-readable medium described above may further include processes, features, means, or instructions for monitoring the radio link quality independent of the periodicity of the discrete transmissions of the RS based at least in part on a detected presence of the RS.

Some examples of the method, apparatus, and non-transitory computer-readable medium described above may further include processes, features, means, or instructions for determining a periodicity of transmission windows for the RS, wherein the RS may be received within respective transmission windows, and monitoring the radio link quality independent of the periodicity of the transmission windows based at least in part on a detected presence of the RS.

In some examples of the method, apparatus, and non-transitory computer-readable medium described above, each of the respective transmission windows comprises one or more TTIs, and the RS may be included within at least one TTI of the one or more TTIs. Some examples of the method, apparatus, and non-transitory computer-readable medium described above may further include processes, features, means, or instructions for receiving an indication of the DRX periodicity or of a length of the respective transmission windows, wherein the indication may be received via radio resource control (RRC) signaling, system information broadcast signaling, or a combination thereof.

Some examples of the method, apparatus, and non-transitory computer-readable medium described above may further include processes, features, means, or instructions for selecting the RS within a particular transmission window for the RLM procedures based at least in part on one or more signal-to-noise ratios (SNRs) of discrete transmissions of the RS within the respective transmission windows.

Some examples of the method, apparatus, and non-transitory computer-readable medium described above may further include processes, features, means, or instructions for selecting the RS within a particular TTI for the RLM procedures based at least in part on one or more SNRs of discrete transmissions of the RS within one or more TTIs within the respective transmission windows. In some examples of the method, apparatus, and non-transitory computer-readable medium described above, the DRX periodicity for the RS may be independent of reception of control channels.

Some examples of the method, apparatus, and non-transitory computer-readable medium described above may further include processes, features, means, or instructions for identifying one or more control resource sets associated with receiving the RS associated with the RLM procedures. In some examples of the method, apparatus, and non-transitory computer-readable medium described above, the one or more control resource sets comprise at least resources associated with a common control channel or resources associated with a UE-specific control channel.

Some examples of the method, apparatus, and non-transitory computer-readable medium described above may further include processes, features, means, or instructions for identifying a first control resource set associated with receiving the RS. Some examples of the method, apparatus, and non-transitory computer-readable medium described above may further include processes, features, means, or instructions for identifying a second control resource set associated with receiving the RS. Some examples of the method, apparatus, and non-transitory computer-readable medium described above may further include processes, features, means, or instructions for using at least the first control resource set, the second control resource set, or a combination thereof the RLM procedures.

Some examples of the method, apparatus, and non-transitory computer-readable medium described above may further include processes, features, means, or instructions for decoding the downlink control channel. Some examples of the method, apparatus, and non-transitory computer-readable medium described above may further include processes, features, means, or instructions for resetting or boosting an RLM counter based at least in part on the decoded downlink control channel.

In some examples of the method, apparatus, and non-transitory computer-readable medium described above, boosting the RLM counter comprises: identifying a type of control channel resources or an aggregation level associated with the downlink control channel. Some examples of the method, apparatus, and non-transitory computer-readable medium described above may further include processes, features, means, or instructions for boosting the RLM counter based at least in part on the identified type of control channel resources or aggregation level.

A method of wireless communication is described. The method may include identifying an RS for RLM procedures, configuring a DRX periodicity for the RS, and transmitting the RS according to the configured DRX periodicity.

An apparatus for wireless communication is described. The apparatus may include means for identifying an RS for RLM procedures, means for configuring a DRX periodicity for the RS, and means for transmitting the RS according to the configured DRX periodicity.

Another apparatus for wireless communication is described. The apparatus may include a processor, memory in electronic communication with the processor, and instructions stored in the memory. The instructions may be operable to cause the processor to identify an RS for RLM procedures, configure a DRX periodicity for the RS, and transmit the RS according to the configured DRX periodicity.

A non-transitory computer-readable medium for wireless communication is described. The non-transitory computer-readable medium may include instructions operable to cause a processor to identify an RS for RLM procedures, configure a DRX periodicity for the RS, and transmit the RS according to the configured DRX periodicity.

Some examples of the method, apparatus, and non-transitory computer-readable medium described above may further include processes, features, means, or instructions for configuring a periodicity of transmission windows for the RS wherein the RS may be transmitted within respective transmission windows, or configuring a periodicity of discrete transmissions of the RS. In some examples of the method, apparatus, and non-transitory computer-readable medium described above, each of the respective transmission windows comprises one or more TTIs, and the RS may be transmitted within at least one TTI of the one or more TTIs.

Some examples of the method, apparatus, and non-transitory computer-readable medium described above may further include processes, features, means, or instructions for transmitting an indication of the DRX periodicity or of a length of the respective transmission windows, wherein the indication may be transmitted via RRC signaling, system information broadcast signaling, or a combination thereof. In some examples of the method, apparatus, and non-transitory computer-readable medium described above, the DRX periodicity for the RS may be independent of control channel transmissions.

Some examples of the method, apparatus, and non-transitory computer-readable medium described above may further include processes, features, means, or instructions for configuring one or more control resource sets for transmission of the RS associated with the RLM procedures. In some examples of the method, apparatus, and non-transitory computer-readable medium described above, the one or more control resource sets comprise at least resources associated with a common control channel or resources associated with a UE-specific control channel.

DETAILED DESCRIPTION

Figure 1:
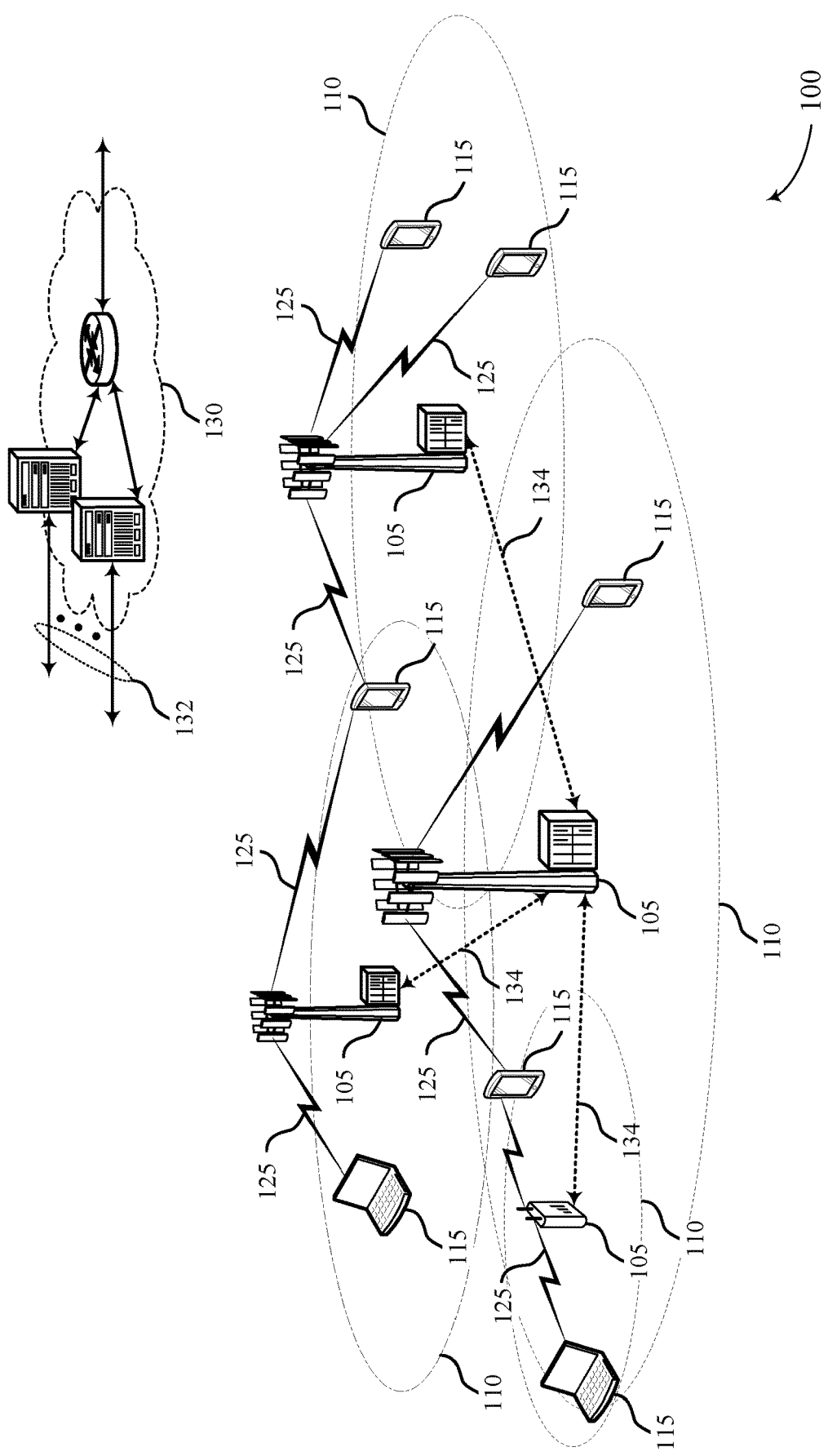
FIG. 1 illustrates an example of a system for wireless communication that supports RLM without always-on RSs in accordance with aspects of the present disclosure.

User equipments (UEs) may monitor downlink radio link quality to determine whether radio link failures occur. For example, in some wireless communications systems, a UE may use a hypothetical control channel block error rate (BLER) (e.g., a BLER of a hypothetical physical downlink control channel (PDCCH)) based on a quality of an always-on cell-specific reference signal (CRS) for radio link monitoring (RLM). However, some systems may not employ a regular or always-on transmission of CRS.

As described herein, RLM procedures within some wireless communications systems may utilize a configured (e.g., a guaranteed) periodicity of a reference signal (RS) associated with downlink control channels (e.g., a physical downlink control channel (PDCCH), an enhanced PDCCH (ePDCCH), and the like). For example, a receiving device (e.g., a UE) may monitor radio link quality at certain intervals based on a discontinuous reception (DRX) periodicity associated with an RS. In such cases, the DRX periodicity may include a discrete periodicity of transmissions of the RS, or may include a periodicity of a transmission window that includes the RS. Accordingly, through the use of the configured RS, a receiving device may perform RLM in the absence of always-on RSs.

In some cases, the transmission of the RS may be independent of control channel transmissions. Additionally, the receiving device may opportunistically monitor downlink radio link quality outside of the configured occasions when the receiving device detects a presence of the RS. The RS may also be associated with certain control channel resource sets. For example, the RS may be associated with common control channels, UE-specific control channels, or both. Accordingly, a receiving device may use different control channel resource sets for RLM procedures using the RS.

Aspects of the disclosure are initially described in the context of a wireless communications system. Examples are also provided that illustrate DRX periodicity used for monitoring radio link quality. Aspects of the disclosure are further illustrated by and described with reference to apparatus diagrams, system diagrams, and flowcharts that relate to RLM without always-on RSs.

While aspects and embodiments are described in this application with reference to certain examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations, and/or to aggregate, distributed, or OEM devices or systems incorporating one or more aspects of the described innovations. In some practical settings, devices incorporating described aspects and features may also necessarily include additional components and features for the implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), an LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the use of configured DRX periodicities to enable efficient RLM procedures that do not rely on an always-on RS.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) or gNodeBs (gNBs) 105.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 megahertz (MHz) to 2600 MHz (2.6 gigahertz (GHz)), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 kilometers (km)) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support beamformed or millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and a network device (e.g., a base station 105), or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 milliseconds (ms) ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kilohertz (kHz) frequency range). A resource block may contain 12 consecutive subcarriers in the frequency domain and, for a normal cyclic prefix in each orthogonal frequency division multiplexed (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexed (FDD) and time division duplexed (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds (μs)). A TTI in eCC may consist of one or multiple symbols. In some cases, the TTI duration (that is, the number of symbols in a TTI) may be variable.

In wireless communications system 100, a UE 115 may be expected to monitor radio link quality to determine whether communications with another wireless device (e.g., a base station 105, another UE 115, etc.) are synchronized (e.g., in-sync) or unsynchronized (e.g., out-of-sync), where the latter case may lead to radio link failure and a dropped communications session if link quality does not improve. In determining whether the UE 115 is in-sync or out-of-sync with another wireless device, the UE 115 may use a number of RLM counters and timers. For instance, an N310 counter may define the number of intervals over which the UE 115 is unable to decode a control channel. The N310 counter may be used to begin a T310 timer during which the UE 115 determines whether it can get back in-sync with the wireless device. Additionally, an N311 counter may define the number of intervals that the UE 115 must decode a control channel before it is determined to be back in-sync with the wireless device. As an illustrative example, upon receiving N310 consecutive out-of-sync indications to higher layers, a UE 115 may start the T310 timer, and upon expiration of the T310 timer, a radio link failure may be declared. However, if N311 consecutive in-sync indications to higher layers are received while the T310 timer is running, the UE 115 may stop the T310 timer. In some cases, each out-of-sync and in-sync indication may be a certain duration (e.g., 10 ms) apart. That is, the UE 115 may determine every 10 ms whether it is in-sync or out-of-sync when communicating with other wireless devices.

In some cases, a UE 115 may monitor a wireless link 125 continuously for an indication that the UE 115 may receive data. In other cases (e.g., to conserve power and extend battery life) a UE 115 may be configured with a DRX cycle. A DRX cycle consists of an "On Duration" when the UE 115 may monitor for control information (e.g., on PDCCH) and a "DRX period" when the UE 115 may power down radio components. In some cases, a UE 115 may be configured with a short DRX cycle and a long DRX cycle. In some cases, a UE 115 may enter a long DRX cycle if the UE 115 is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. Additionally, the UE 115 may be configured with DRX periodicity that enables monitoring for RSs at discrete times, or within transmission windows.

Wireless communications system 100 may support the use of a DRX periodicity to enable monitoring of an RS (e.g., associated with a downlink control channel) used for RLM procedures. For example, a base station 105 may configure a DRX periodicity for an RS, where the configured DRX periodicity may include a periodicity of discrete transmissions of the RS or a periodicity of a transmission window in which the RS is located (e.g., within at least one TTI of respective transmission windows). Accordingly, a UE 115 may identify the DRX periodicity and monitor radio link quality using the RS based on the DRX periodicity. In some examples, the RS may be transmitted independent of control channel transmissions, and the base station 105 may configure one or more control resource sets for the RS. Additionally, the UE 115 may opportunistically monitor radio link quality independent of the configured DRX periodicity associated with the RS (e.g., the receiving device may monitor radio link quality outside of the configured discrete transmissions or transmission windows).

Figure 2:
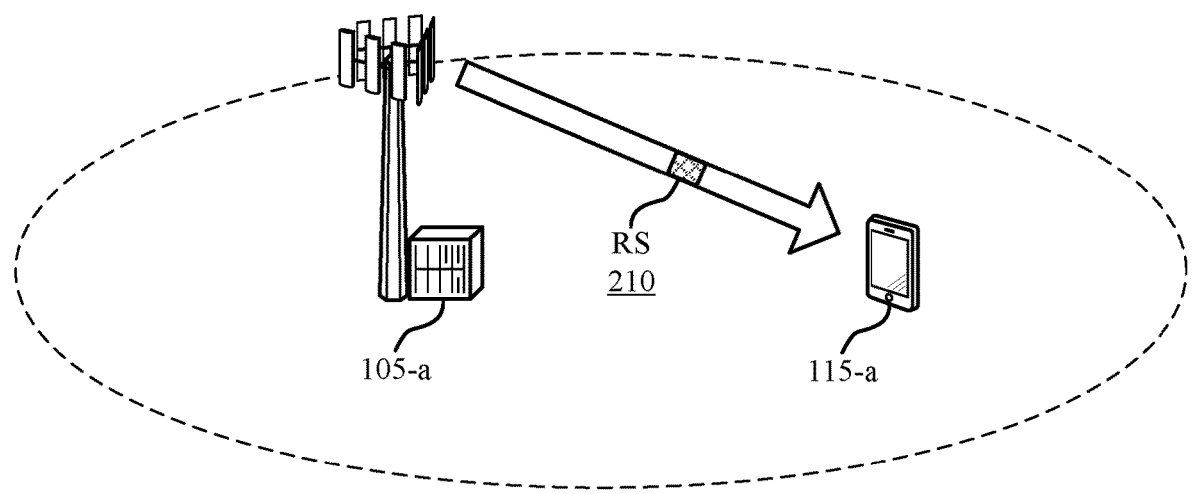
FIG. 2 illustrates an example of a wireless communications system that supports RLM without always-on RSs in accordance with aspects of the present disclosure.

FIG. 2 illustrates an example of a wireless communications system 200 that supports RLM without always-on RSs in accordance with various aspects of the present disclosure. Wireless communications system 200 includes a UE 115-a and base station 105-a, which may be examples of the corresponding devices as described with reference to FIG. 1. Wireless communications system 200 may be an example of a system that does not use an always-on RS (such as a CRS), but utilizes a configured RS for downlink control channels that enables a UE 115 to perform RLM procedures.

For example, RLM within wireless communications system 200 may utilize a configured (or a guaranteed) periodicity of an RS 210 for downlink control channels. In such cases, UE 115-a may monitor downlink radio link quality at certain intervals based on a DRX periodicity associated with an RS 210 for a downlink control channel. The DRX periodicity may include a discrete periodicity for transmissions of the RS 210. In some cases, UE 115-a may opportunistically monitor downlink radio link quality outside or independent of the configured occasions (e.g., the discrete periodicity) when UE 115-a detects a presence of the RS 210. In some examples, RS 210 may include a CRS, a channel state information RS (CSI-RS), a synchronization signal burst (SSB), a demodulation reference signal (DMRS), or other types of RSs.

Additionally or alternatively, the RS 210 may be transmitted within a certain window. That is, the DRX periodicity may include a periodicity of a transmission window for the RS 210, and UE 115-a may monitor for transmissions of the RS 210 during the transmission window for RLM purposes. Transmitting the RS 210 within at least one TTI (e.g., a slot) of the transmission window may allow jittering of transmission occasions of the RS 210, and may enable scheduling flexibility for base station 105-a. Accordingly, UE 115-a may monitor downlink radio link quality of the RS(s) 210 within the configured transmission window. In such cases, UE 115-a may determine signal-to-noise ratios (SNRs) of RSs within respective transmission windows, and select an RS in a particular transmission window for use in RLM procedures based on the SNRs. In some cases, UE 115-a may select the RS with the highest SNR (e.g., an RS having a highest quality) relative to SNRs of other RSs. Additionally or alternatively, UE 115-a may opportunistically take (e.g., measure) any SNRs of RSs from other slots within a window when UE 115-a detects the presence of the RS 210. In some examples, UE 115-a may monitor downlink radio link quality outside of the configured transmission window when UE 115-a detects the presence of the RS 210.

Base station 105-b may indicate the DRX periodicity to UE 115-a using RRC signaling, or may transmit the DRX periodicity using a system information broadcast. In some cases, such as when the DRX periodicity comprises a transmission window, the indication may include a size, duration, or length of the transmission window. As a result, UE 115-a may determine the periodicity of the window and the length of the window to assist UE 115-a in monitoring for the RSs 210.

The use of the RS 210 within a window may enable base station 105-a to transmit the RS 210 independent of the presence of a control channel within the window, at least for a single slot according to the configured window periodicities on configured resources. In some cases, if UE 115-a does not detect any presence of the RS 210 within a transmission window (e.g., because of a low RS SNR), UE 115-a may select the RS with the highest SNR within a transmission window to use for RLM procedures.

In some cases, the RS 210 may be associated with certain control channel resource sets. For example, the RS may be associated with common control channels, UE-specific control channels, group specific control channels, or a combination thereof. That is, base station 105-a may configure more than one control resource sets for the purpose of RLM for UE 115-a. Accordingly, base station 105-a may configure which control resource sets provide the RS 210. In such cases, base station 105-a may transmit the RS 210 independent of a control channel (e.g., a control channel may not be present at the DRX periodicity when the RS 210 is transmitted), which may be in accordance with configured periodicities on configured resources. The configured DRX periodicity may enable the avoidance of ambiguity between RSs with a low SNR and muted RSs at UE 115-a.

In some cases, base station 105-a may configure more than one control channel resource set for the purpose of RLM. UE 115-a may accordingly use one control resource set (e.g., a control resource set that includes a primary common PDCCH) as a default set for an SNR measurement. Additionally or alternatively, UE 115-a may optionally use other control resource sets for SNR measurements, where measurement accuracy may not be any worse than using the default resource set. In some cases, UE 115-a may use all of the configured control resource sets for measurements, using a combined SNR or a maximum SNR among all of the sets for RLM.

Upon decoding a downlink control channel, UE 115-*a* may use different techniques to manage RLM counters and timers. For example, upon successfully decoding the downlink control channel, UE 115-*a* may reset a first RLM counter (e.g., an N310 counter). Additionally or alternatively, UE 115-*a* may boost a second RLM counter (e.g., an N311 counter), where boosting the counter may include increasing an amount by which the counter increments (e.g., by a certain boosting factor). For example, where the N311 counter may initially increment by one, the N311 counter may increment by five after being boosted. In some cases, different control channels (e.g., common control and UE-specific control channels) may have different boosting factors associated with them, where, for example, decoding a UE-specific control channel may be associated with a larger boosting factor than decoding a common control channel. Additionally or alternatively, aggregation level information of a decoded downlink control channel may also be reflected in the boosting factor (e.g., a smaller aggregation level may have a larger boosting factor).

In some cases, wireless communications system 200 may use an indication that signals single beam or multiple beam communications within the system. For example, base station 105-*a* may transmit a multi-beam indication to UE 115-*a* that signals that communications within wireless communications system 200 utilize multiple directional beams (not shown). Alternatively, a single beam indication may be transmitted to UE 115-*a* that signals a deployment that utilizes single beam transmissions. In some cases, the indication may be sent using different signaling schemes, such as via synchronization signals (e.g., included in an SSB), a master information block (MIB), a system information block (SIB), an RRC configuration, or the like. Accordingly, the use of the RS 210 for RLM procedures described herein may be implemented in single beam and multi-beam deployments.

Figure 3:
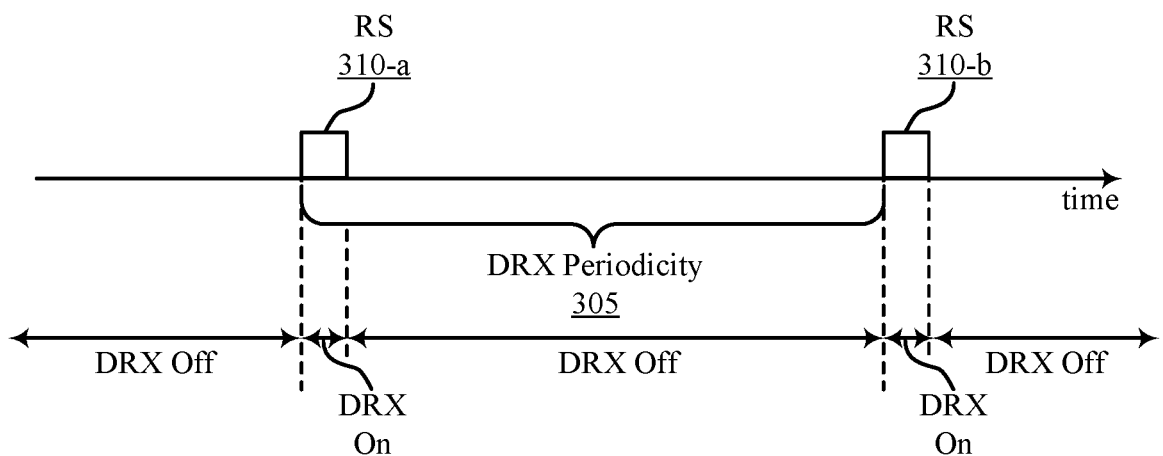
FIGS. 3 and 4 illustrate examples of DRX configurations that support RLM without always-on RSs in accordance with aspects of the present disclosure.

FIG. 3 illustrates an example of a DRX configuration 300 that supports RLM without always-on RSs in accordance with various aspects of the present disclosure. DRX configuration 300 illustrates an example of a DRX periodicity for discrete transmissions of an RS for a downlink control channel for RLM procedures.

DRX configuration 300 may include a DRX periodicity 305 including a DRX On duration and a DRX Off duration. The DRX periodicity 305 may be configured by a transmitting device (e.g., a base station 105) such that a receiving device (e.g., a UE 115) may wake up during a DRX On duration to monitor for transmissions of an RS 310 for a downlink control channel (e.g., including at least a first RS 310-*a* for a downlink control channel, a second RS 310-*b* for a downlink control channel, and so forth) for RLM procedures. DRX configuration 300 may support a periodicity of discrete transmissions of RS 310, which a UE 115 may use for monitoring radio link quality (e.g., in a system that does not use always-on transmissions of a CRS). Accordingly, each DRX On duration within the DRX periodicity may provide the UE 115 a configured (or guaranteed) time during which the RS 310 is transmitted, and the UE 115 may perform measurements of the quality of the RS 310. For example, the UE 115 may measure an SNR of the RS 310, a signal-to-interference plus noise ratio (SINR) of the RS 310, or a bit error rate of RS 310 to determine the quality of RS 310. In some examples, a UE may perform the RLM procedures using a hypothetical downlink control channel (e.g., based on a quality or SNR of an RS that is associated with a hypothetical PDCCH).

In some cases, each transmission of RSs 310 may be independent of a presence of a control channel. For instance, the transmission of a control channel may not coincide with, or occur at a different time than, the transmission of RSs 310. Additionally, a base station 105 may configure control channel resource sets (e.g., resource blocks), which may be associated with common control channels and/or UE-specific control channels. The transmission of the discrete RSs 310 according to the DRX periodicity 305 may circumvent ambiguity in different RSs 310 received, such as an RS 310 having a low SNR and muted RSs 310.

A UE 115 may monitor downlink radio link quality outside of the configured occasions when the UE 115 detects the presence of the RS 310. As an example, the UE 115 may opportunistically monitor radio link quality at instances either before or after the transmission of an RS 310 for a downlink control channel.

Figure 4:
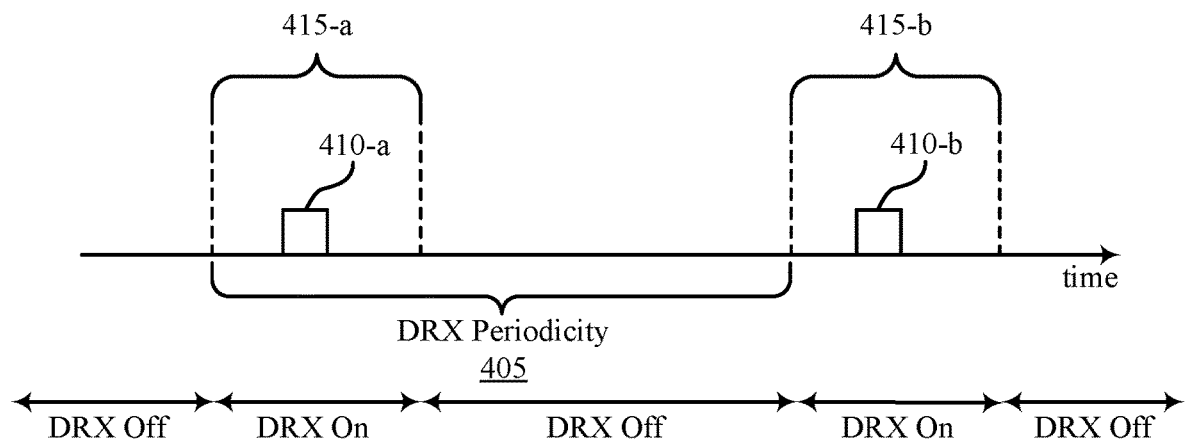

FIG. 4 illustrates an example of a DRX configuration 400 that supports RLM without always-on RSs in accordance with various aspects of the present disclosure. DRX configuration 400 illustrates an example of a DRX periodicity for transmission windows, where respective transmission windows include a transmission of an RS for a downlink control channel and used for RLM procedures.

DRX configuration 400 may include a DRX periodicity 405 including a DRX On duration and a DRX Off duration. The DRX periodicity 405 may be configured by a transmitting device (e.g., a base station 105) such that a receiving device (e.g., a UE 115) may wake up during a DRX On duration to monitor for transmissions of an RS 410 for a downlink control channel (e.g., including at least a first RS 410-*a*, a second RS 410-*b*, and so forth). DRX configuration 400 may support a configuration of a periodicity of transmission windows 415, where each transmission window 415 may include a respective transmission of RS 410 that a UE 115 may use for monitoring radio link quality (e.g., in a system that does not use always-on transmissions of a CRS). For example, a first transmission window 415-*a* may include the first RS 410-*a*, which may be included in at least one TTI (e.g., slot) of the first transmission window 415-*a*. Likewise, a second transmission window 415-*b* may include the second RS 410-*b* during at least one TTI, and so forth.

Accordingly, each DRX On duration within DRX periodicity 405 may provide the UE 115 a configured (or guaranteed) window during which an RS 410 for a downlink control channel is transmitted. In some cases, the UE 115 may take a highest SNR within a transmission window 415 for RLM procedures. Additionally or alternatively, the UE 115 may take SNRs from other TTIs within the transmission window 415 when the presence of RS 410 is detected. The use of the transmission windows 415 may enable jittering of the transmission of the RS 410, which may provide scheduling flexibility for the transmitter.

Additionally or alternatively, a UE 115 may monitor downlink radio link quality outside of the configured transmission windows 415 when the UE 115 detects the presence of the RS 410. As an example, the UE 115 may opportunistically monitor radio link quality at instances either before or after the transmission windows 415. In some cases, the RS 410 within a transmission window 415 may be transmitted independently of a presence of a control channel.

Figure 5:
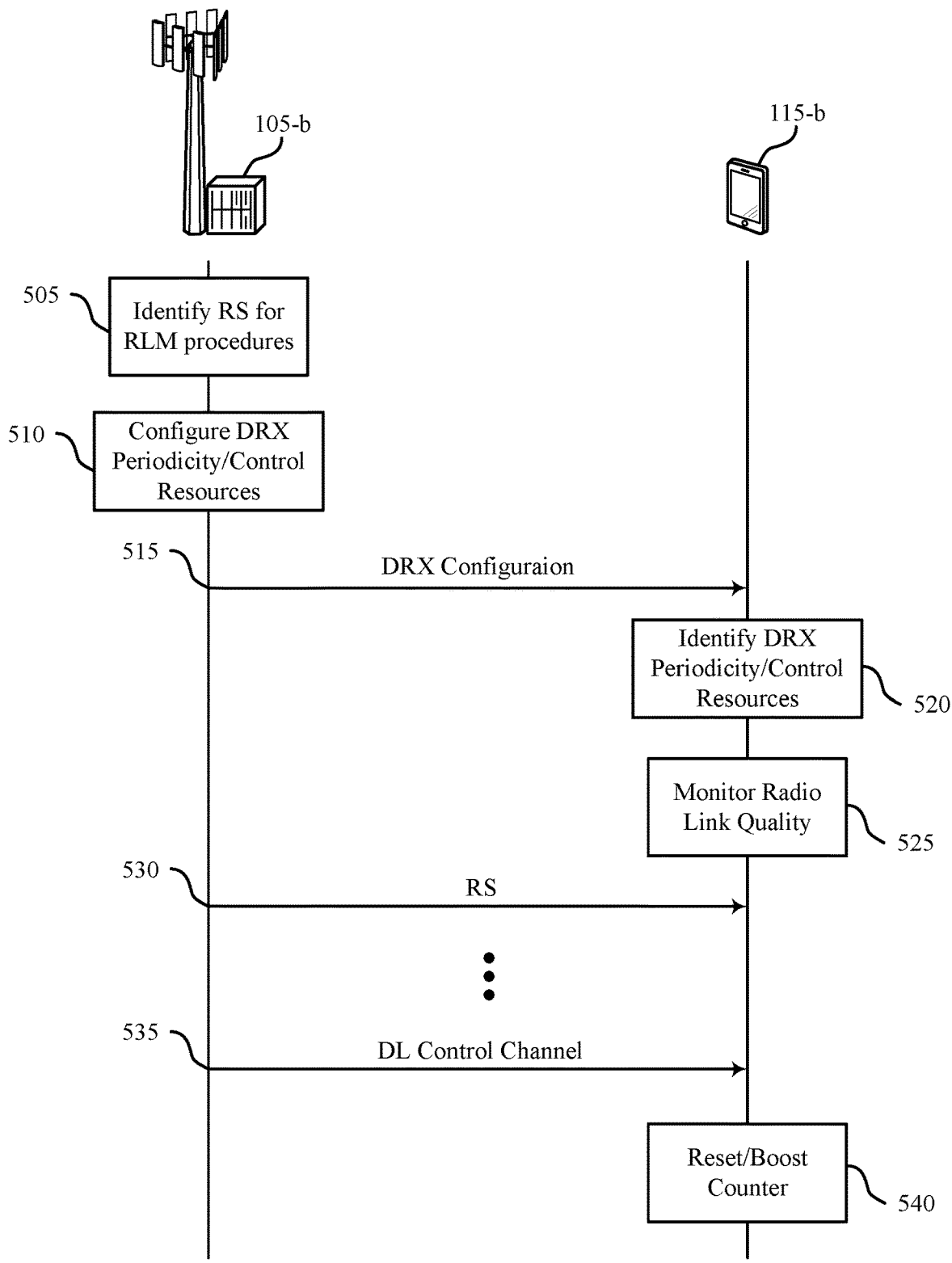
FIG. 5 illustrates an example of a process flow in a system that supports RLM without always-on RSs in accordance with aspects of the present disclosure.

FIG. 5 illustrates an example of a process flow 500 in a system that supports RLM without always-on RSs in accordance with various aspects of the present disclosure. Process flow 500 includes a UE 115-*b* and base station 105-*b*, which may be examples of the corresponding devices as described with reference to FIGS. 1 and 2. Process flow 500 illustrates an example of the use of an RS for downlink control channels, where the RS is used for RLM procedures in a system that does not include transmissions of an always-on RS (such as a CRS).

At 505, base station 105-*b* may identify an RS that may be associated with RLM procedures. The RS may be associated with a downlink control channel (e.g., PDCCH or ePDCCH). At 505, base station 105-*b* may configure a DRX periodicity for the RS. In some cases, configuring the DRX periodicity for the RS may include configuring a periodicity of discrete transmissions of the RS. Additionally or alternatively, configuring the DRX periodicity for the RS may include configuring a periodicity of transmission windows for the RS, wherein the RS is transmitted within respective transmission windows. In such cases, at least one TTI within the respective transmission windows may include the RS.

In some cases, the DRX periodicity for the RS may be independent of control channel transmissions from base station 105-*b*. At 510, base station 105-*b* may also configure one or more control resource sets associated with transmission of the RS associated with the RLM procedures. In such cases, the control resource sets may include resources associated with a common control channel or resources associated with a UE-specific control channel.

At 515, base station 105-*b* may transmit, and UE 115-*b* may receive, an indication of the DRX configuration. That is, base station 105-*b* may signal to UE 115-*b* the configured DRX periodicity for the RS. In some cases, the indication may be transmitted using RRC signaling, system information broadcast signaling, or a combination thereof. In some examples, base station 105-*b* may transmit an indication of a length of the respective transmission windows.

At 520, UE 115-*b* may identify the DRX periodicity for the RS associated with the RLM procedures. For example, identifying the DRX periodicity for the RS may include determining a periodicity of discrete transmissions of the RS. Additionally or alternatively, identifying the DRX periodicity for the RS may include determining a periodicity of transmission windows for the RS, wherein the RS is received within respective transmission windows. In such cases, UE 115-*b* may use a highest SNR within respective transmission windows for the RLM procedures, or may use an SNR associated with one or more TTIs (e.g., a slot) within respective transmission windows for the RLM procedures.

At 520, UE 115-*b* may identify one or more control resource sets associated with receiving the RS associated with the RLM procedures. In some cases, UE 115-*b* may identify a first control resource set, identify a second control resource set associated with receiving the RS, and use at least the first control resource set, the second control resource set, or a combination thereof for the RLM procedures. For instance, UE 115-*b* may select the first control resource set as a default set (which may correspond to a control resource set associated with a primary common PDCCH). UE 115-*b* may optionally use the second control resource set (or other control resource sets) for radio link quality measurements in cases where the accuracy of the measurements on the second control resource set are not worse than measurements on the first control resource set.

At 525, UE 115-*b* may monitor radio link quality based at least in part on the identified DRX periodicity. In some examples, UE 115-*b* may detect a presence of the RS and monitor radio link quality independent of the periodicity of the discrete transmissions. In other cases, UE 115-*b* may monitor the radio link quality independent of the periodicity of the transmission windows based on the detected presence of the RS.

At 530, base station 105-*b* may transmit, and UE 115-*b* may receive, the RS according to the DRX periodicity. At 535, base station may transmit a downlink control channel to UE 115-*b*. Upon decoding the downlink control channel, UE 115-*b* may reset and/or boost an RLM counter based on successfully decoding the control channel. For instance, at 540, UE 115-*b* may decode the control channel and reset an N310 counter. Additionally or alternatively, UE 115-*b* may decode the control channel and boost an N311 counter at 540. In some cases, boosting the N311 counter (e.g., according to a boosting factor) may be based on a type of control channel resources associated with the control channel, or may be based on an aggregation level of the control channel.

Figure 6:
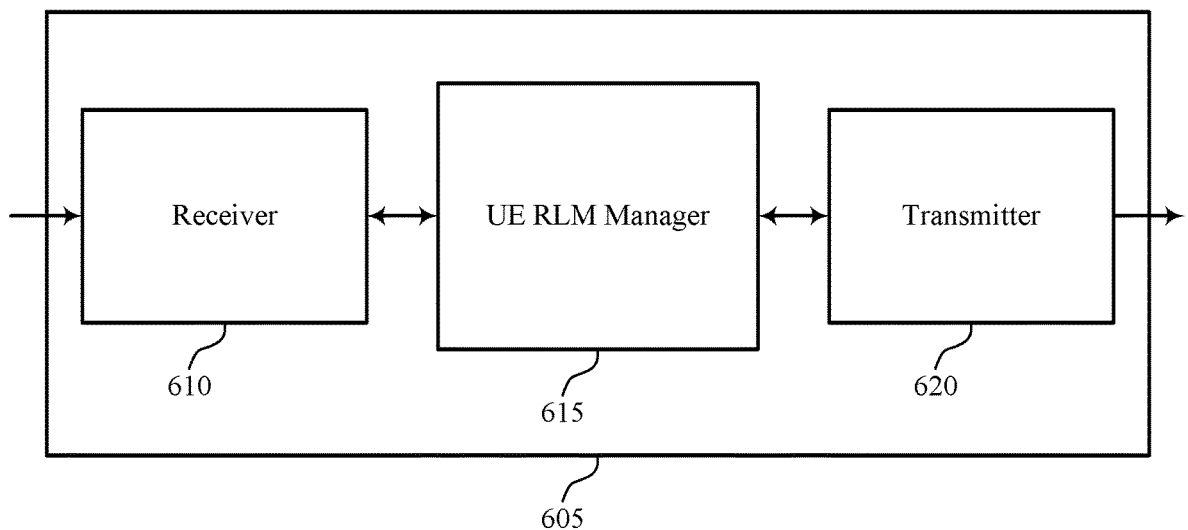
FIGS. 6 through 8 show block diagrams of a device that supports RLM without always-on RSs in accordance with aspects of the present disclosure.

FIG. 6 shows a block diagram 600 of a wireless device 605 that supports RLM without always-on RSs in accordance with aspects of the present disclosure. Wireless device 605 may be an example of aspects of a receiving device, such as a UE 115, as described with reference to FIG. 1. Wireless device 605 may include receiver 610, UE RLM manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to RLM without always-on RSs, etc.). Information may be passed on to other components of the device. The receiver 610 may be an example of aspects of the transceiver 935 described with reference to FIG. 9. The receiver 610 may utilize a single antenna or a set of antennas.

UE RLM manager 615 may be an example of aspects of the UE RLM manager 915 described with reference to FIG. 9. UE RLM manager 615 and/or at least some of its various sub-components may be implemented in hardware, software executed by a processor, firmware, or any combination thereof. If implemented in software executed by a processor, the functions of the UE RLM manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE RLM manager 615 and/or at least some of its various sub-components may be physically located at various positions, including being distributed such that portions of functions are implemented at different physical locations by one or more physical devices. In some examples, UE RLM manager 615 and/or at least some of its various sub-components may be a separate and distinct component in accordance with various aspects of the present disclosure. In other examples, UE RLM manager 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE RLM manager 615 may identify a DRX periodicity for an RS for a downlink control channel, where the RS may be associated with RLM procedures, monitor a radio link quality based on the identified DRX periodicity, and receive the RS according to the DRX periodicity.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
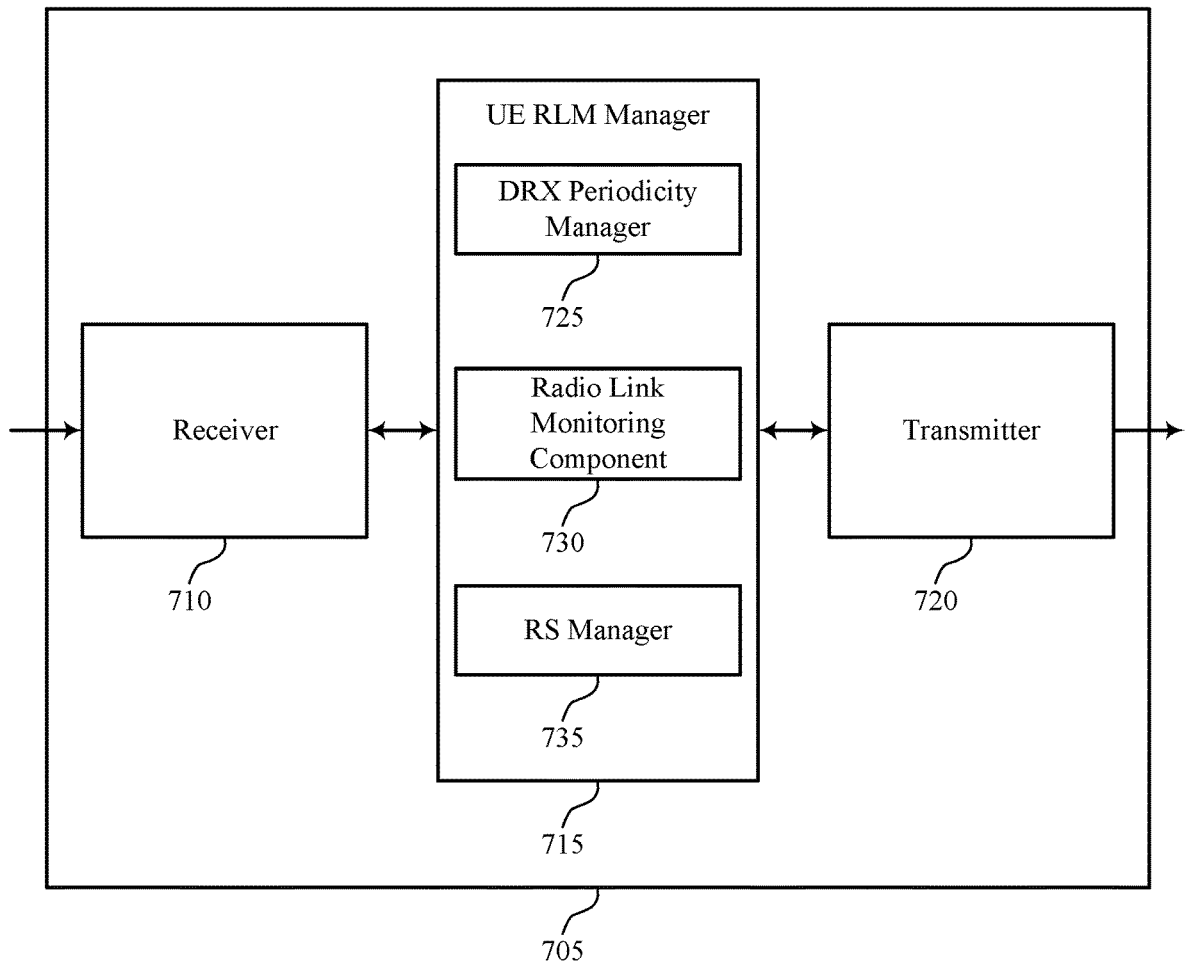

FIG. 7 shows a block diagram 700 of a wireless device 705 that supports RLM without always-on RSs in accordance with aspects of the present disclosure. Wireless device 705 may be an example of aspects of a wireless device 605 or a UE 115 as described with reference to FIGS. 1 and 6. Wireless device 705 may include receiver 710, UE RLM manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to RLM without always-on RSs, etc.). Information may be passed on to other components of the device. The receiver 710 may be an example of aspects of the transceiver 935 described with reference to FIG. 9. The receiver 710 may utilize a single antenna or a set of antennas. UE RLM manager 715 may be an example of aspects of the UE RLM manager 915 described with reference to FIG. 9. UE RLM manager 715 may also include DRX periodicity manager 725, radio link monitoring component 730, and RS manager 735.

DRX periodicity manager 725 may identify a DRX periodicity for an RS for a downlink control channel, where the RS may be associated with RLM procedures. In some cases, identifying the DRX periodicity for the RS includes determining a periodicity of discrete transmissions of the RS. Additionally or alternatively, identifying the DRX periodicity for the RS includes determining a periodicity of transmission windows for the RS, where the RS is received within respective transmission windows. In some cases, at least one TTI within the respective transmission windows includes the RS. In some cases, the DRX periodicity for the RS is independent of reception of control channels.

In some cases, DRX periodicity manager 725 may receive an indication of a length of the respective transmission windows, where the indication is received via RRC signaling, system information broadcast signaling, or a combination thereof. Additionally, DRX periodicity manager 725 may receive an indication of the DRX periodicity, where the indication is also received via RRC signaling, system information broadcast signaling, or a combination thereof.

Radio link monitoring component 730 may monitor a radio link quality based on the identified DRX periodicity. In some cases, radio link monitoring component 730 may monitor the radio link quality independent of the periodicity of the discrete transmissions based on the detected presence of the RS. Additionally, or alternatively, radio link monitoring component 730 may monitor the radio link quality independent of the periodicity of the transmission windows based on the detected presence of the RS. In such cases, radio link monitoring component 730 may use a highest SNR within respective transmission windows for the RLM procedures or use a SNR associated with one or more TTIs within respective transmission windows for the RLM procedures, or a combination thereof.

In some examples, radio link monitoring component 730 may use at least a first control resource set, a second control resource set, or a combination thereof for the RLM procedures. RS manager 735 may receive the RS according to the DRX periodicity and detect a presence of the RS.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
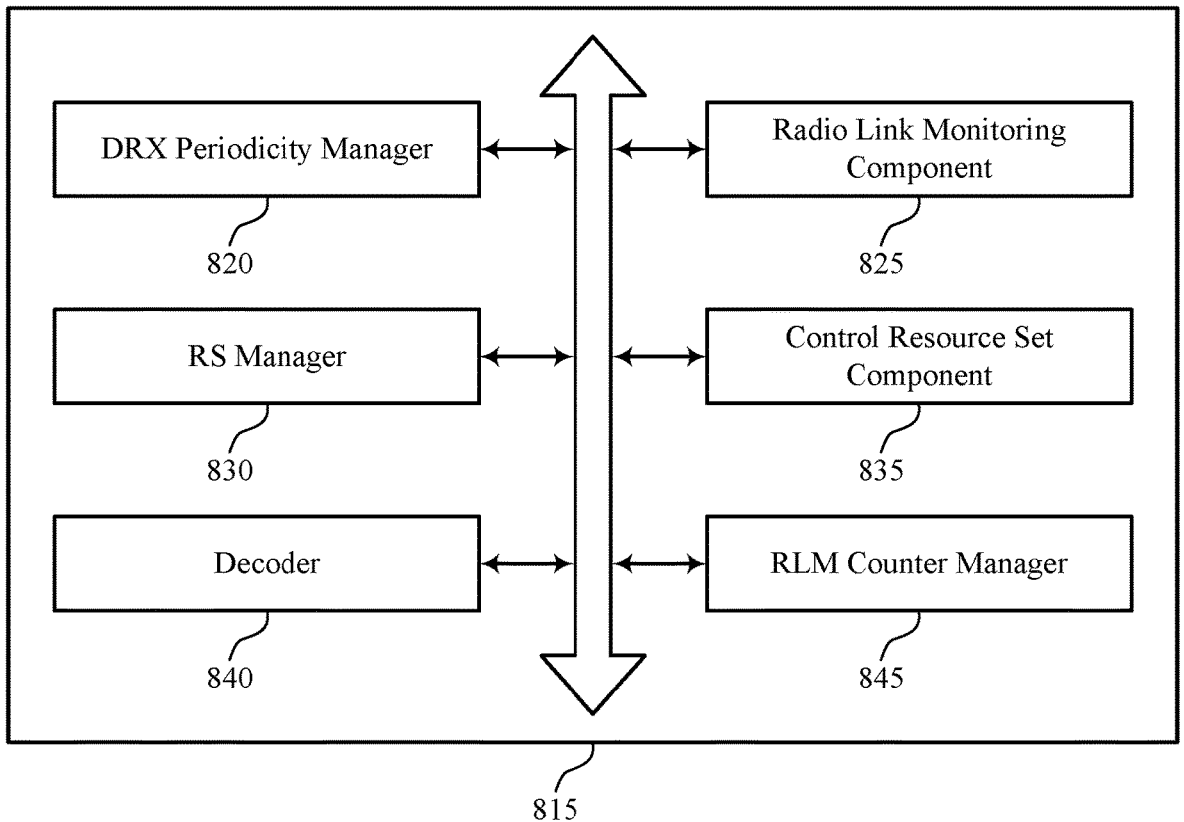

FIG. 8 shows a block diagram 800 of a UE RLM manager 815 that supports RLM without always-on RSs in accordance with aspects of the present disclosure. The UE RLM manager 815 may be an example of aspects of a UE RLM manager 615, a UE RLM manager 715, or a UE RLM manager 915 described with reference to FIGS. 6, 7, and 9. The UE RLM manager 815 may include DRX periodicity manager 820, radio link monitoring component 825, RS manager 830, control resource set component 835, decoder 840, and RLM counter manager 845. Each of these modules may communicate, directly or indirectly, with one another (e.g., via one or more buses).

DRX periodicity manager 820 may identify a DRX periodicity for an RS for a downlink control channel, where the RS may be associated with RLM procedures. In some cases, identifying the DRX periodicity for the RS includes determining a periodicity of discrete transmissions of the RS. Additionally or alternatively, identifying the DRX periodicity for the RS includes determining a periodicity of transmission windows for the RS, where the RS is received within respective transmission windows. In some cases, at least one TTI within the respective transmission windows includes the RS. For instance, each of the respective transmission windows may be comprised of one or more TTIs (e.g., slots), and the RS may be transmitted by a base station 105 within at least one of the slots. In some cases, the DRX periodicity for the RS is independent of reception of control channels.

In some cases, DRX periodicity manager 820 may receive an indication of a length of the respective transmission windows, where the indication is received via RRC signaling, system information broadcast signaling, or a combination thereof. Additionally, DRX periodicity manager 820 may receive an indication of the DRX periodicity, where the indication is also received via RRC signaling, system information broadcast signaling, or a combination thereof.

Radio link monitoring component 825 may monitor a radio link quality based on the identified DRX periodicity and monitor the radio link quality independent of the periodicity of the discrete transmissions based on the detected presence of the RS. In some examples, radio link monitoring component 825 may monitor the radio link quality independent of the periodicity of the transmission windows based on the detected presence of the RS. In some cases, radio link monitoring component 825 may use a highest SNR within respective transmission windows for the RLM procedures. Additionally or alternatively, radio link monitoring component 825 may use an SNR associated with one or more TTIs within respective transmission windows for the RLM procedures. In some examples, radio link monitoring component 825 may use at least the first control resource set, the second control resource set, or a combination thereof for the RLM procedures.

RS manager 830 may receive the RS according to the DRX periodicity and detect a presence of the RS. Control resource set component 835 may identify one or more control resource sets associated with receiving the RS associated with the RLM procedures. In some cases, control resource set component 835 may identify a first control resource set associated with receiving the RS and identify a second control resource set associated with receiving the RS. In some cases, the one or more control resource sets include at least resources associated with a common control channel or resources associated with a UE-specific control channel.

Decoder 840 may decode a downlink control channel. RLM counter manager 845 may reset an RLM counter based on the decoded downlink control channel. Additionally or alternatively, RLM counter manager 845 may boost an RLM counter based on the decoded downlink control channel. In some cases, boosting the RLM counter may include identifying an aggregation level associated with the downlink control channel and boosting the RLM counter based on the identified aggregation level. Additionally or alternatively, boosting the RLM counter may include identifying a type of control channel resources associated with the downlink control channel (e.g., common control, group-specific, or UE-specific) and boosting the RLM counter based on the identified type of control channel resources.

Figure 9:
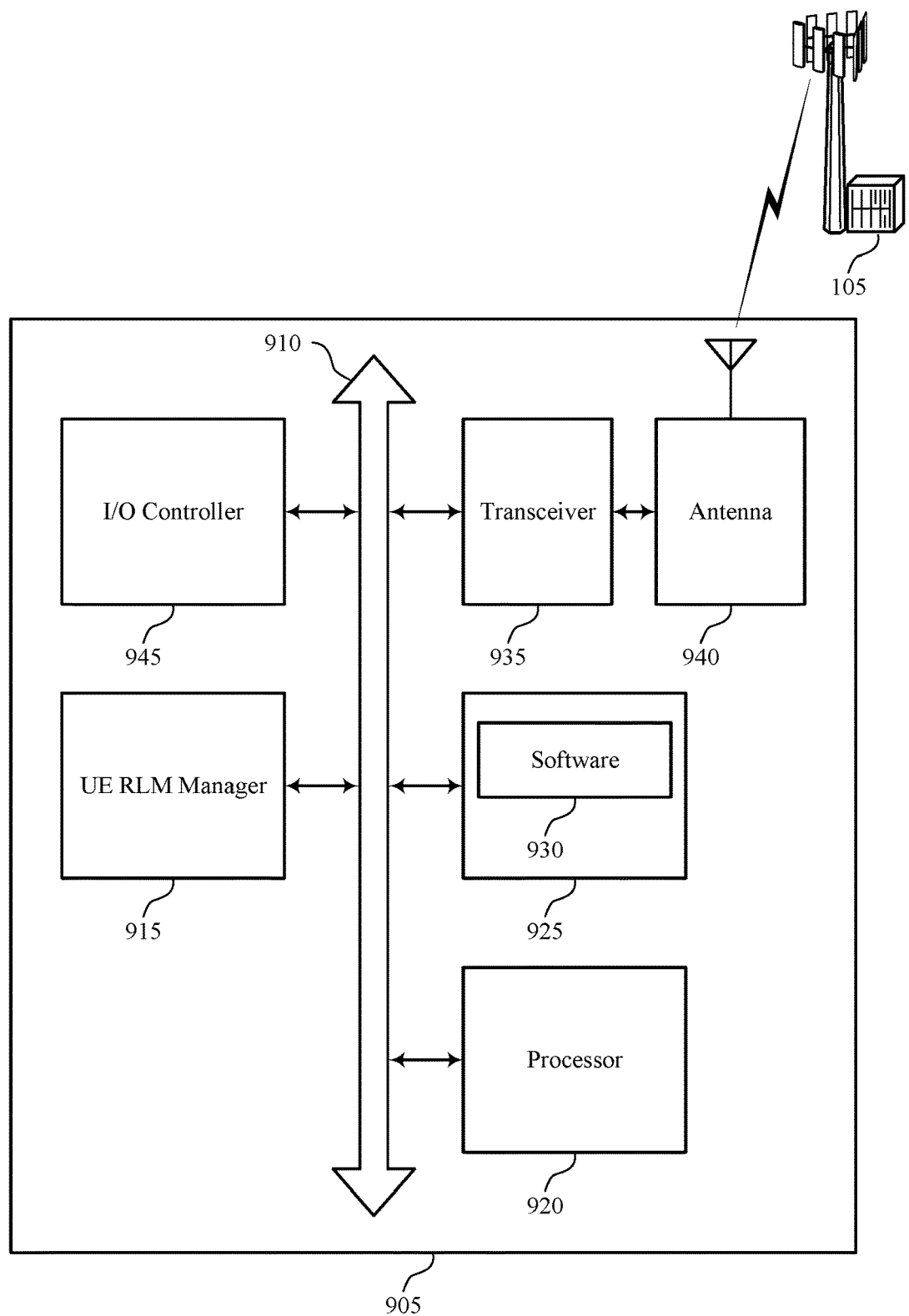
FIG. 9 illustrates a block diagram of a system including a UE that supports RLM without always-on RSs in accordance with aspects of the present disclosure.

FIG. 9 shows a diagram of a system 900 including a device 905 that supports RLM without always-on RSs in accordance with aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE RLM manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting RLM without always-on RSs). For example, processor 920 may be configured to execute instructions to identify a DRX periodicity for an RS and monitor a radio link quality using the identified DRX periodicity. Processor 920 may also be configured to execute instructions to detect or select an RS, decode a downlink control channel, reset or boost an RLM counter, and/or measure the quality of an RS, among other functions.

Memory 925 may include random-access memory (RAM) and read-only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support RLM without always-on RSs. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions. Transceiver 935 may, for example, receive an RS, receive an indication of a length of a transmission window, and/or receive an indication of a DRX periodicity.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
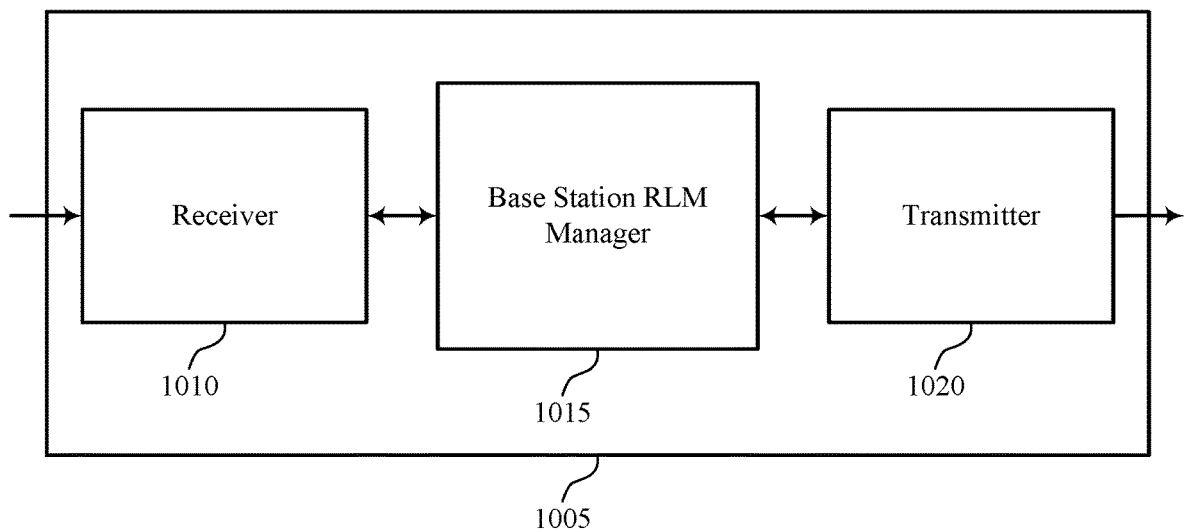
FIGS. 10 through 12 show block diagrams of a device that supports RLM without always-on RSs in accordance with aspects of the present disclosure.

FIG. 10 shows a block diagram 1000 of a wireless device 1005 that supports RLM without always-on RSs in accordance with aspects of the present disclosure. Wireless device 1005 may be an example of aspects of a transmitting device, such as a base station 105, as described with reference to FIG. 1. Wireless device 1005 may include receiver 1010, base station RLM manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to RLM without always-on RSs, etc.). Information may be passed on to other components of the device. The receiver 1010 may be an example of aspects of the transceiver 1335 described with reference to FIG. 13. The receiver 1010 may utilize a single antenna or a set of antennas.

Base station RLM manager 1015 may be an example of aspects of the base station RLM manager 1315 described with reference to FIG. 13. Base station RLM manager 1015 and/or at least some of its various sub-components may be implemented in hardware, software executed by a processor, firmware, or any combination thereof. If implemented in software executed by a processor, the functions of the base station RLM manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station RLM manager 1015 and/or at least some of its various sub-components may be physically located at various positions, including being distributed such that portions of functions are implemented at different physical locations by one or more physical devices. In some examples, base station RLM manager 1015 and/or at least some of its various sub-components may be a separate and distinct component in accordance with various aspects of the present disclosure. In other examples, base station RLM manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station RLM manager 1015 may identify an RS for a downlink control channel, where the RS may be associated with RLM procedures and configure a DRX periodicity for the RS. Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas. In some examples, transmitter 1020 may transmit the RS according to the configured DRX periodicity.

Figure 11:
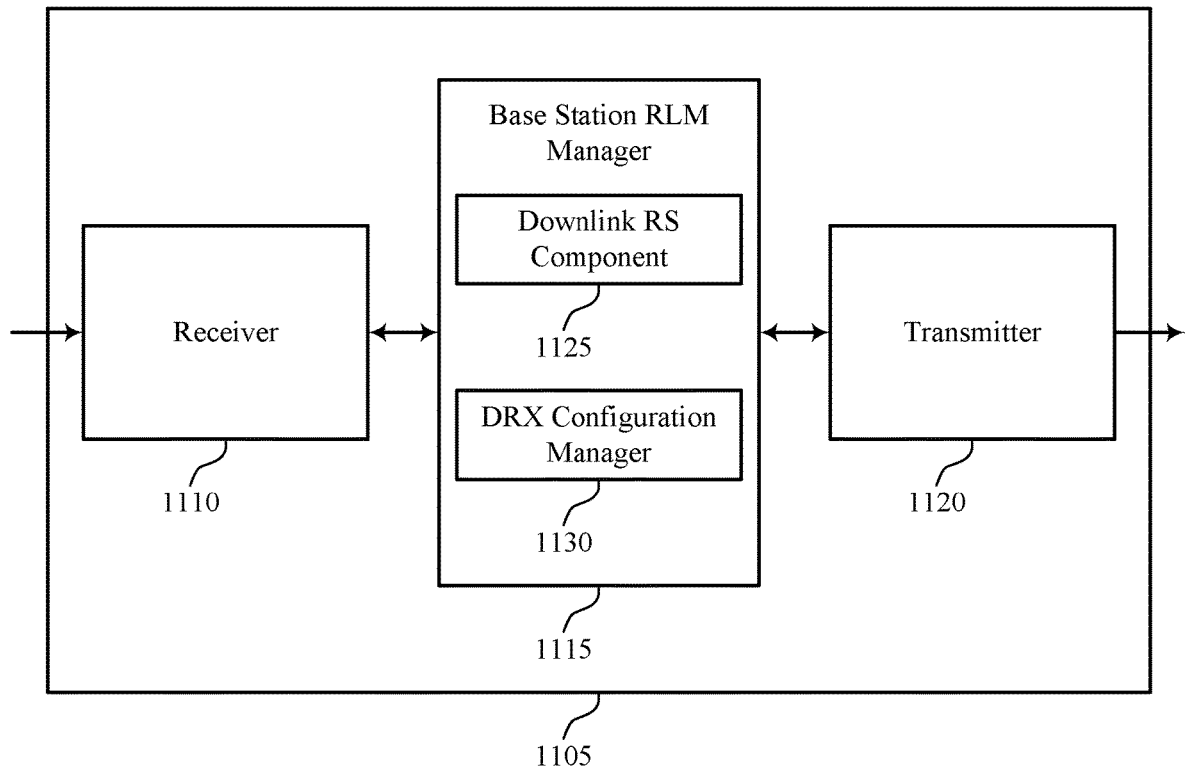

FIG. 11 shows a block diagram 1100 of a wireless device 1105 that supports RLM without always-on RSs in accordance with aspects of the present disclosure. Wireless device 1105 may be an example of aspects of a wireless device 1005 or a base station 105 as described with reference to FIGS. 1 and 10. Wireless device 1105 may include receiver 1110, base station RLM manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to RLM without always-on RSs, etc.). Information may be passed on to other components of the device. The receiver 1110 may be an example of aspects of the transceiver 1335 described with reference to FIG. 13. The receiver 1110 may utilize a single antenna or a set of antennas.

Base station RLM manager 1115 may be an example of aspects of the base station RLM manager 1315 described with reference to FIG. 13. Base station RLM manager 1115 may also include downlink RS component 1125 and DRX configuration manager 1130. Downlink RS component 1125 may identify an RS that may be associated with RLM procedures. The RS may be associated with a downlink control channel.

DRX configuration manager 1130 may configure a DRX periodicity for the RS. In some cases, configuring the DRX periodicity for the RS may include configuring a periodicity of discrete transmissions of the RS. Additionally or alternatively, configuring the DRX periodicity for the RS may include configuring a periodicity of transmission windows for the RS, where the RS is transmitted within respective transmission windows. In some cases, each of the respective transmission windows comprises one or more TTIs, and the RS may be included within at least one TTI of the one or more TTIs. In some cases, the DRX periodicity for the RS is independent of control channel transmissions. In some cases, DRX configuration manager 1130 may transmit an indication of a length of the respective transmission windows, where the indication is transmitted via RRC signaling, system information broadcast signaling, or a combination thereof.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas. In some examples, transmitter 1120 may transmit the RS according to the configured DRX periodicity.

Figure 12:
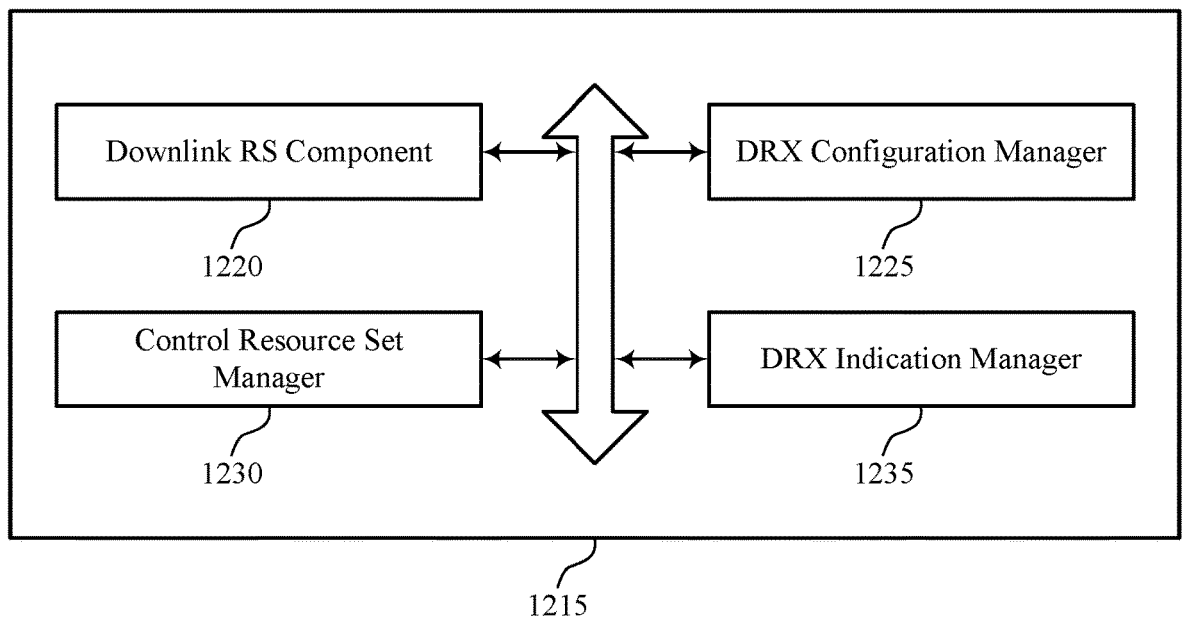

FIG. 12 shows a block diagram 1200 of a base station RLM manager 1215 that supports RLM without always-on RSs in accordance with aspects of the present disclosure. The base station RLM manager 1215 may be an example of aspects of a base station RLM manager 1315 described with reference to FIGS. 10, 11, and 13. The base station RLM manager 1215 may include downlink RS component 1220, DRX configuration manager 1225, control resource set manager 1230, and DRX indication manager 1235. Each of these modules may communicate, directly or indirectly, with one another (e.g., via one or more buses).

Downlink RS component 1220 may identify an RS that may be associated with RLM procedures. The RS may be associated with a downlink control channel. DRX configuration manager 1225 may configure a DRX periodicity for the RS. In some cases, configuring the DRX periodicity for the RS may include configuring a periodicity of discrete transmissions of the RS. Additionally or alternatively, configuring the DRX periodicity for the RS may include configuring a periodicity of transmission windows for the RS, where the RS is transmitted within respective transmission windows. In some cases, at least one TTI within the respective transmission windows includes the RS. In some cases, the DRX periodicity for the RS is independent of control channel transmissions. In some cases, DRX configuration manager 1225 may transmit an indication of a length of the respective transmission windows, where the indication is transmitted via RRC signaling, system information broadcast signaling, or a combination thereof.

Control resource set manager 1230 may configure one or more control resource sets for transmission of the RS associated with the RLM procedures. In some cases, the one or more control resource sets include at least resources associated with a common control channel or resources associated with a UE-specific control channel. DRX indication manager 1235 may transmit an indication of the configured DRX periodicity, where the indication is transmitted using RRC signaling, system information broadcast signaling, or a combination thereof.

Figure 13:
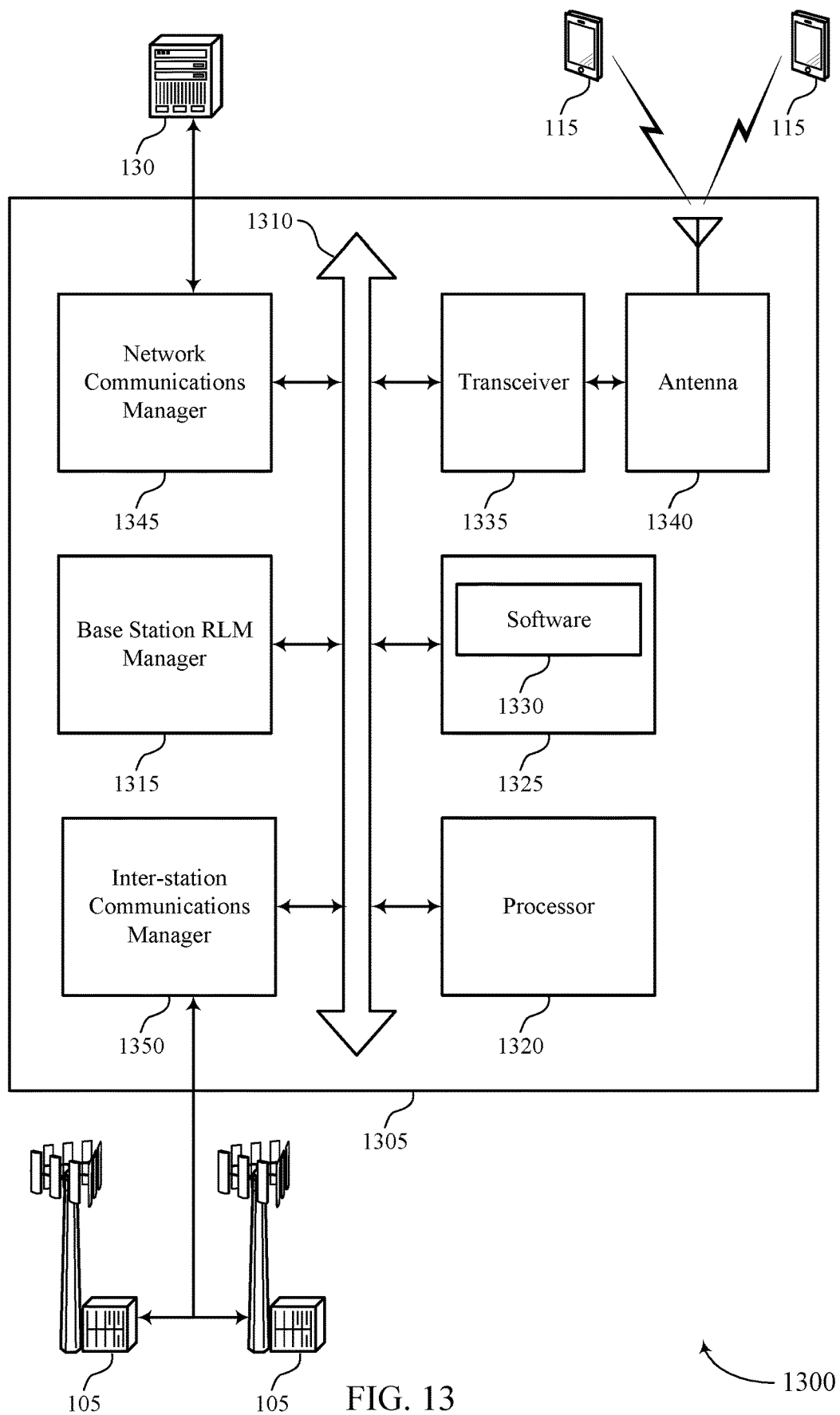
FIG. 13 illustrates a block diagram of a system including a base station that supports RLM without always-on RSs in accordance with aspects of the present disclosure.

FIG. 13 shows a diagram of a system 1300 including a device 1305 that supports RLM without always-on RSs in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station RLM manager 1315, processor 1320, memory 1325, software 1330, transceiver 1335, antenna 1340, network communications manager 1345, and inter-station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting RLM without always-on RSs). For example, processor 1320 may be configured to execute computer-readable instructions to identify an RS, configure a DRX periodicity for the RS, configure a periodicity of discrete transmissions and/or of transmission windows for the RS, and/or configure control resource sets, among other functions.

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support RLM without always-on RSs. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions. Transceiver 1335 may, for example, transmit an RS, transmit an indication of a length of a transmission window, and/or transmit an indication of the configured DRX periodicity.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base stations 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
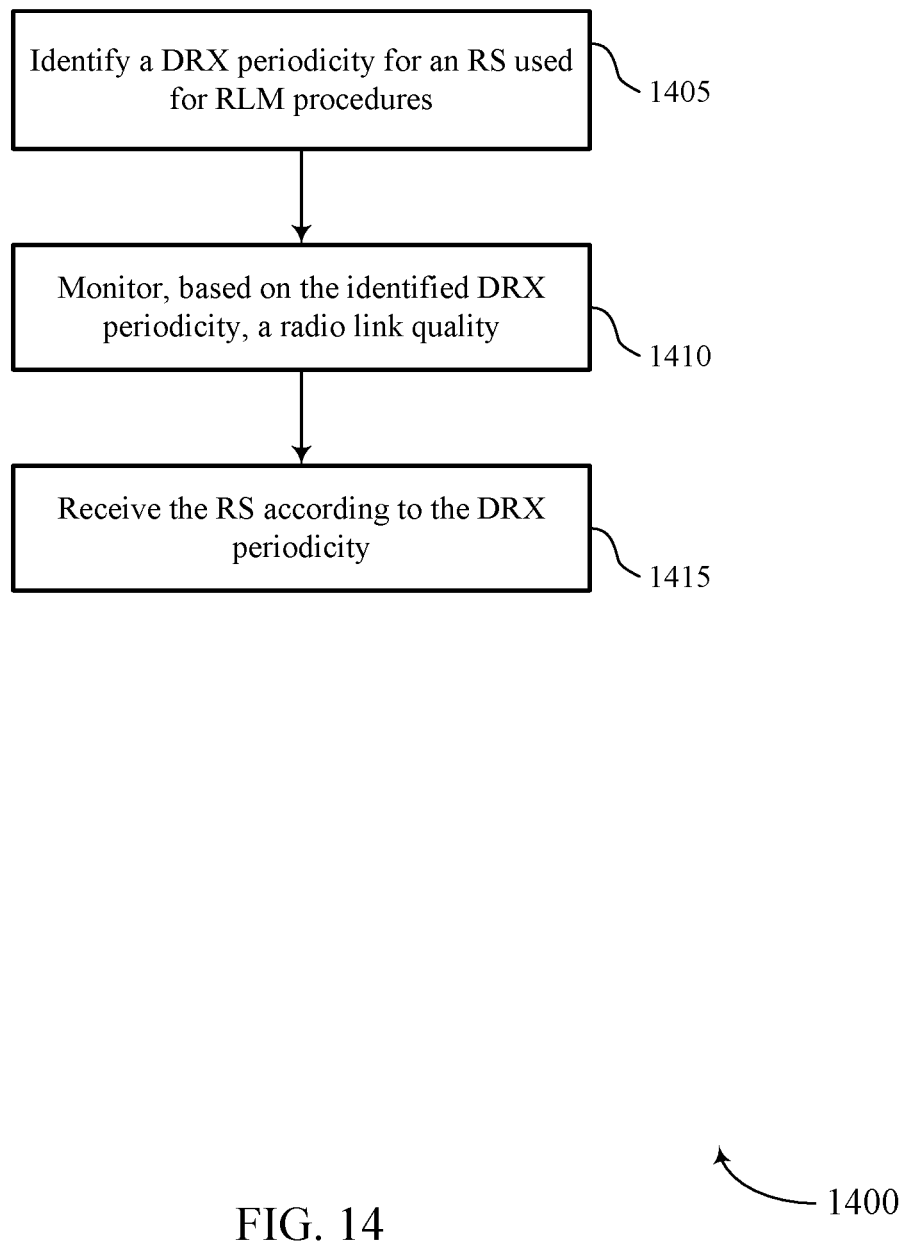
FIGS. 14 through 19 illustrate methods for RLM without always-on RSs in accordance with aspects of the present disclosure.

FIG. 14 shows a flowchart illustrating a method 1400 for RLM without always-on RSs in accordance with aspects of the present disclosure. The operations of method 1400 may be implemented by a receiving device, such as a UE 115, or its components as described herein. For example, the operations of method 1400 may be performed by a UE RLM manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may identify a DRX periodicity for an RS associated with RLM procedures. The RS may be associated with a downlink control channel. The operations of 1405 may be performed according to the methods described with reference to FIGS. 1 through 5. In certain examples, aspects of the operations of 1405 may be performed by a DRX periodicity manager as described with reference to FIGS. 6 through 9.

At 1410 the UE 115 may monitor a radio link quality based at least in part on the identified DRX periodicity. The operations of 1410 may be performed according to the methods described with reference to FIGS. 1 through 5. In certain examples, aspects of the operations of 1410 may be performed by a radio link monitoring component as described with reference to FIGS. 6 through 9.

At 1415 the UE 115 may receive the RS according to the DRX periodicity. The operations of 1415 may be performed according to the methods described with reference to FIGS. 1 through 5. In certain examples, aspects of the operations of 1415 may be performed by an RS manager as described with reference to FIGS. 6 through 9.

Figure 15:
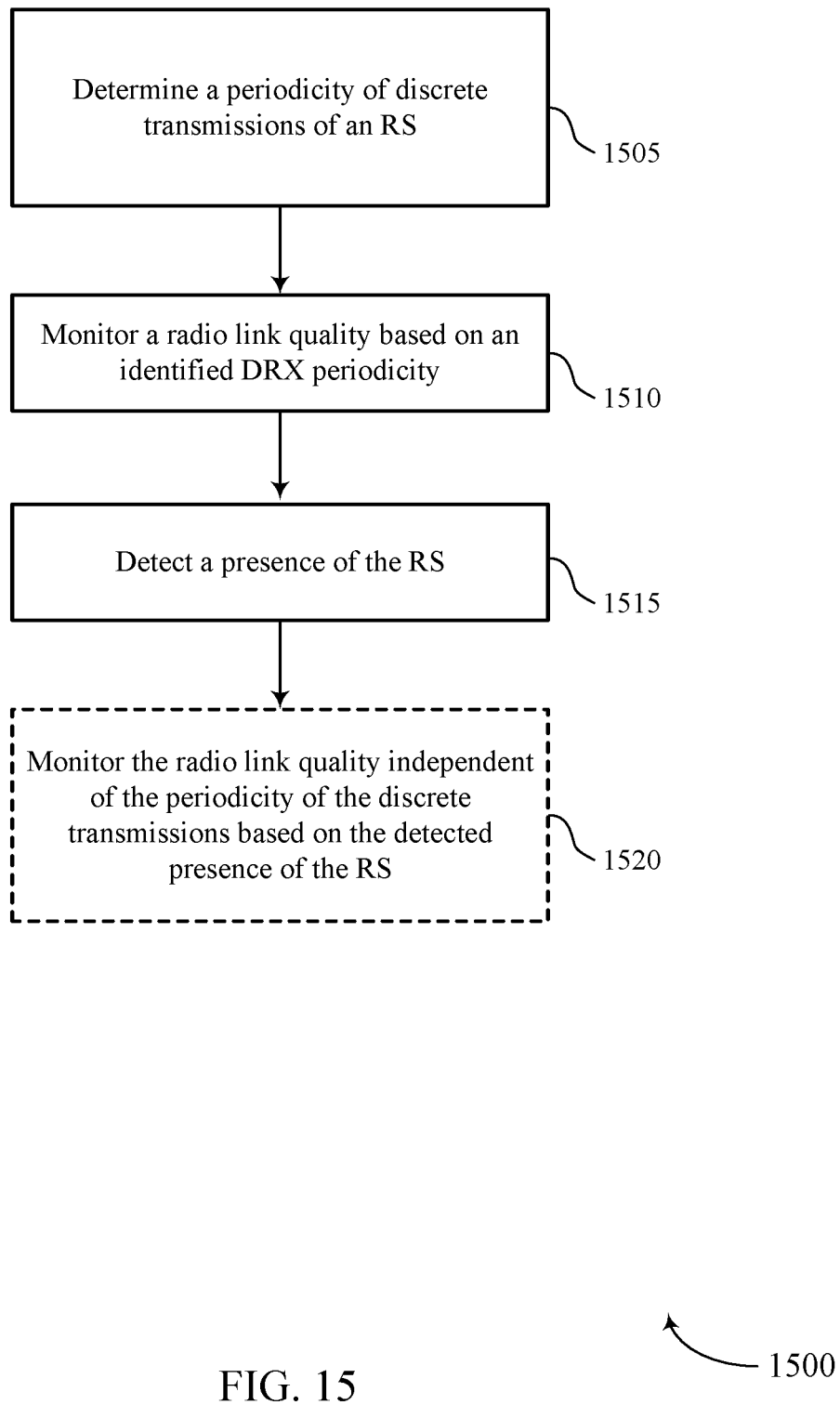

FIG. 15 shows a flowchart illustrating a method 1500 for RLM without always-on RSs in accordance with aspects of the present disclosure. The operations of method 1500 may be implemented by a receiving device, such as a UE 115, or its components as described herein. For example, the operations of method 1500 may be performed by a UE RLM manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may determine a periodicity of discrete transmissions of an RS. The operations of 1505 may be performed according to the methods described with reference to FIGS. 1 through 5. In certain examples, aspects of the operations of 1505 may be performed by a DRX periodicity manager as described with reference to FIGS. 6 through 9.

At 1510 the UE 115 may monitor a radio link quality based at least in part on an identified DRX periodicity. The operations of 1510 may be performed according to the methods described with reference to FIGS. 1 through 5. In certain examples, aspects of the operations of 1510 may be performed by a radio link monitoring component as described with reference to FIGS. 6 through 9.

At 1515 the UE 115 may detect a presence of the RS. The operations of 1515 may be performed according to the methods described with reference to FIGS. 1 through 5. In certain examples, aspects of the operations of 1515 may be performed by an RS manager as described with reference to FIGS. 6 through 9.

At 1520 the UE 115 may optionally (e.g., opportunistically) monitor the radio link quality independent of the periodicity of the discrete transmissions of the RS based at least in part on the detected presence of the RS. The operations of 1520 may be performed according to the methods described with reference to FIGS. 1 through 5. In certain examples, aspects of the operations of 1520 may be performed by a radio link monitoring component as described with reference to FIGS. 6 through 9.

Figure 16:
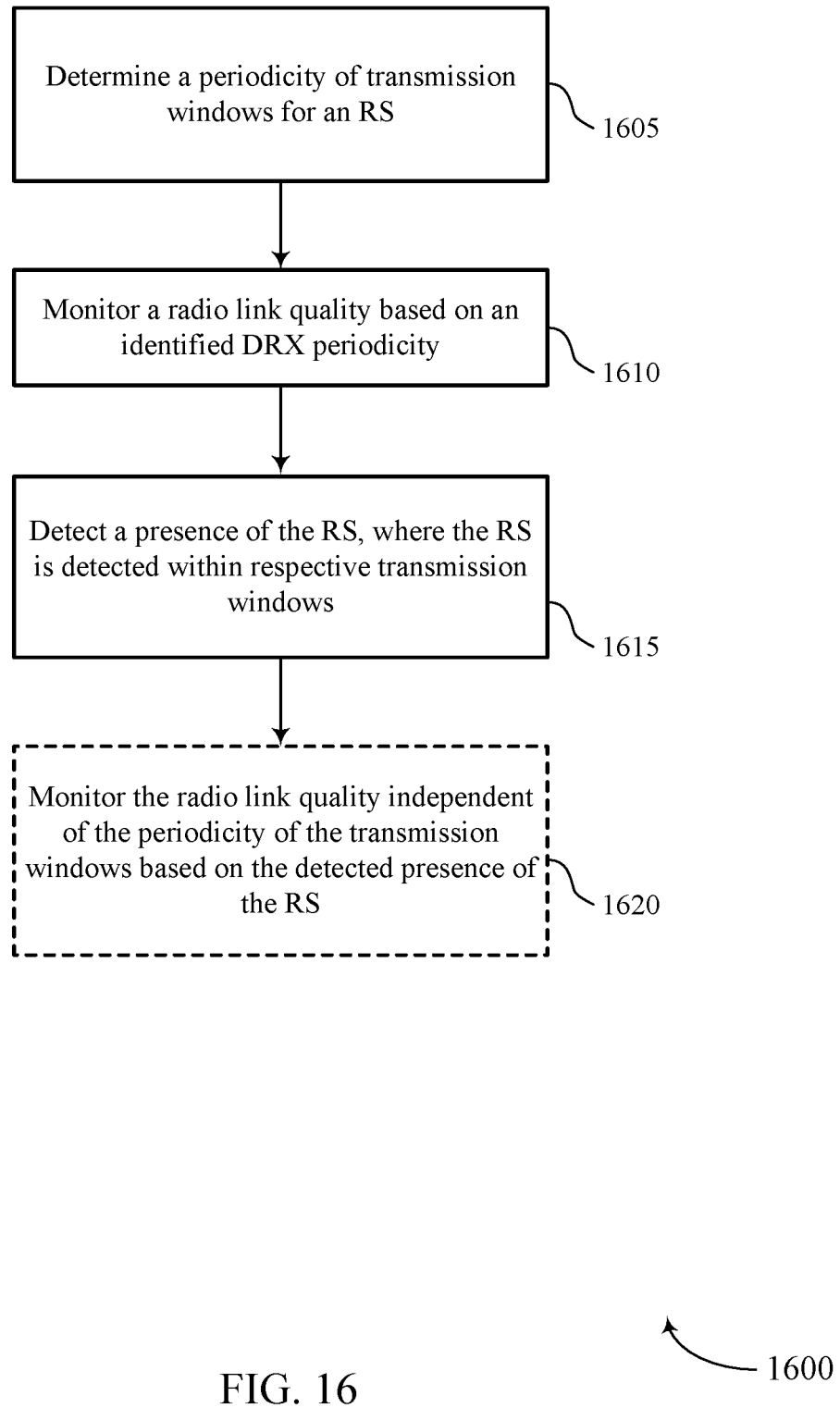

FIG. 16 shows a flowchart illustrating a method 1600 for RLM without always-on RSs in accordance with aspects of the present disclosure. The operations of method 1600 may be implemented by a receiving device, such as a UE 115, or its components as described herein. For example, the operations of method 1600 may be performed by a UE RLM manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may determine a periodicity of transmission windows for an RS. The operations of 1605 may be performed according to the methods described with reference to FIGS. 1 through 5. In certain examples, aspects of the operations of 1605 may be performed by a DRX periodicity manager as described with reference to FIGS. 6 through 9.

At 1610 the UE 115 may monitor a radio link quality based at least in part on an identified DRX periodicity. The operations of 1610 may be performed according to the methods described with reference to FIGS. 1 through 5. In certain examples, aspects of the operations of 1610 may be performed by a radio link monitoring component as described with reference to FIGS. 6 through 9.

At 1615 the UE 115 may detect a presence of the RS, where the RS is detected within respective transmission windows. The operations of 1615 may be performed according to the methods described with reference to FIGS. 1 through 5. In certain examples, aspects of the operations of 1615 may be performed by an RS manager as described with reference to FIGS. 6 through 9.

At 1620 the UE 115 may optionally (e.g., opportunistically) monitor the radio link quality independent of the periodicity of the transmission windows based at least in part on the detected presence of the RS. The operations of 1620 may be performed according to the methods described with reference to FIGS. 1 through 5. In certain examples, aspects of the operations of 1620 may be performed by a radio link monitoring component as described with reference to FIGS. 6 through 9.

Figure 17:
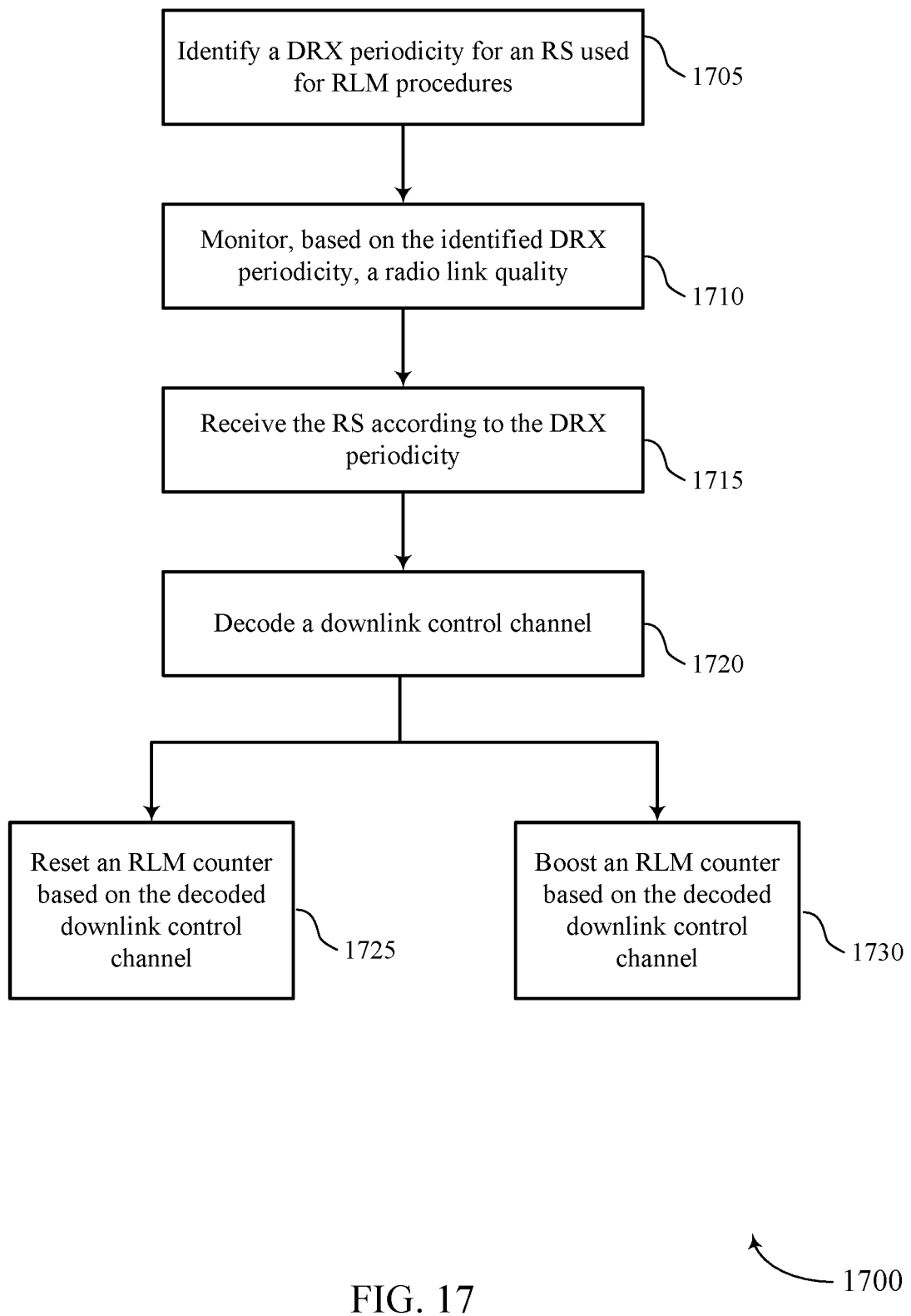

FIG. 17 shows a flowchart illustrating a method 1700 for RLM without always-on RSs in accordance with aspects of the present disclosure. The operations of method 1700 may be implemented by a receiving device, such as a UE 115, or its components as described herein. For example, the operations of method 1700 may be performed by a UE RLM manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may identify a DRX periodicity for an RS associated with RLM procedures. The RS may be associated with a downlink control channel. The operations of 1705 may be performed according to the methods described with reference to FIGS. 1 through 5. In certain examples, aspects of the operations of 1705 may be performed by a DRX periodicity manager as described with reference to FIGS. 6 through 9.

At 1710 the UE 115 may monitor a radio link quality based at least in part on the identified DRX periodicity. The operations of 1710 may be performed according to the methods described with reference to FIGS. 1 through 5. In certain examples, aspects of the operations of 1710 may be performed by a radio link monitoring component as described with reference to FIGS. 6 through 9.

At 1715 the UE 115 may receive the RS according to the DRX periodicity. The operations of 1715 may be performed according to the methods described with reference to FIGS. 1 through 5. In certain examples, aspects of the operations of 1715 may be performed by an RS manager as described with reference to FIGS. 6 through 9.

At 1720 the UE 115 may decode a downlink control channel. The operations of 1720 may be performed according to the methods described with reference to FIGS. 1 through 5. In certain examples, aspects of the operations of 1720 may be performed by a decoder as described with reference to FIGS. 6 through 9.

At 1725 the UE 115 may reset an RLM counter (e.g., an N310 counter) based at least in part on the decoded downlink control channel. The operations of 1725 may be performed according to the methods described with reference to FIGS. 1 through 5. In certain examples, aspects of the operations of 1725 may be performed by a RLM counter manager as described with reference to FIGS. 6 through 9.

At 1730 the UE 115 may boost an RLM counter (e.g., an N311 counter) based at least in part on the decoded downlink control channel. The operations of 1730 may be performed according to the methods described with reference to FIGS. 1 through 5. In certain examples, aspects of the operations of 1730 may be performed by a RLM counter manager as described with reference to FIGS. 6 through 9.

Figure 18:
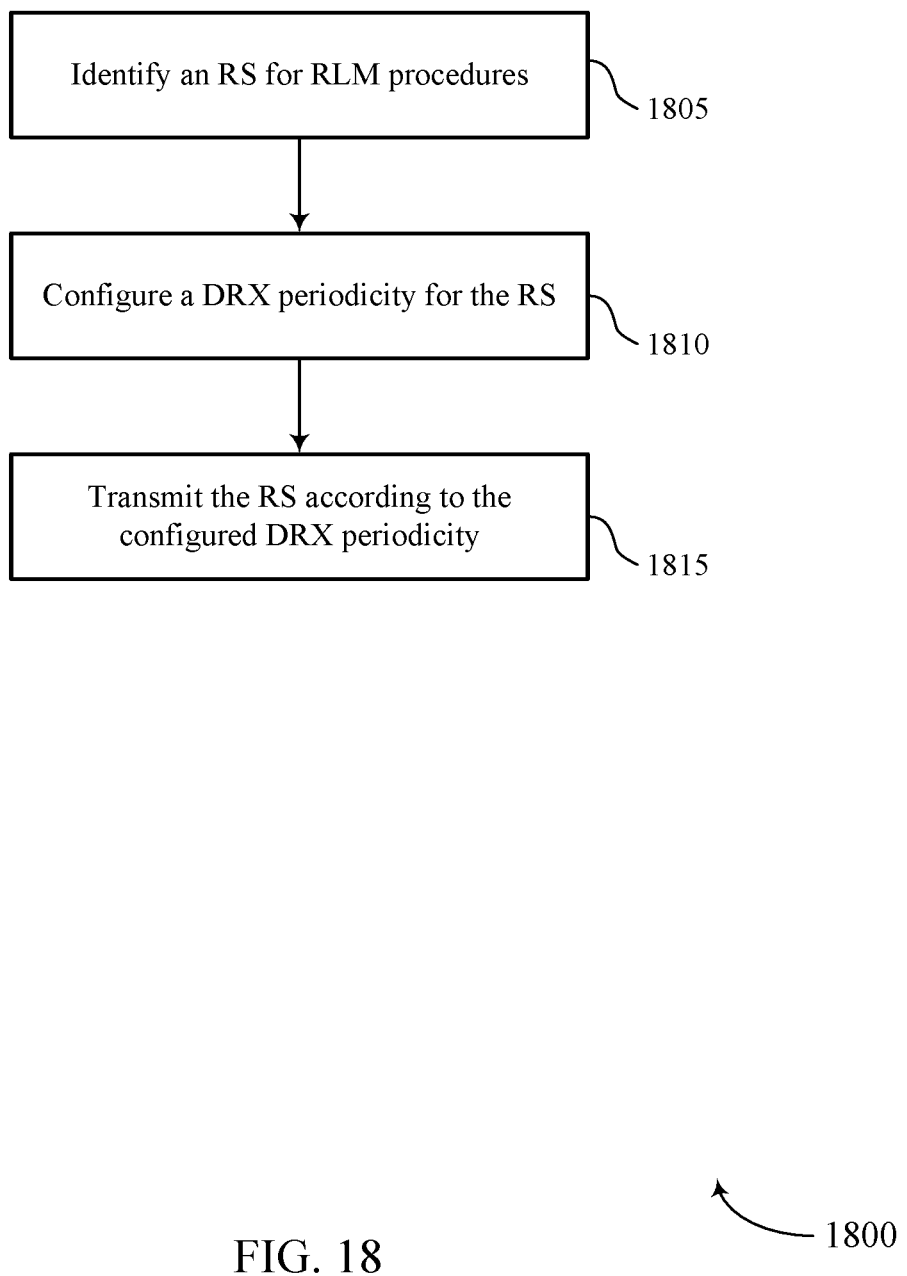

FIG. 18 shows a flowchart illustrating a method 1800 for RLM without always-on RSs in accordance with aspects of the present disclosure. The operations of method 1800 may be implemented by a transmitting device, such as a base station 105, or its components as described herein. For example, the operations of method 1800 may be performed by a base station RLM manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may identify an RS associated with RLM procedures. The RS may be associated with a downlink control channel. The operations of 1805 may be performed according to the methods described with reference to FIGS. 1 through 5. In certain examples, aspects of the operations of 1805 may be performed by a downlink RS component as described with reference to FIGS. 10 through 13.

At 1810 the base station 105 may configure a DRX periodicity for the RS. The operations of 1810 may be performed according to the methods described with reference to FIGS. 1 through 5. In certain examples, aspects of the operations of 1810 may be performed by a DRX configuration manager as described with reference to FIGS. 10 through 13.

At 1815 the base station 105 may transmit the RS according to the configured DRX periodicity. The operations of 1815 may be performed according to the methods described with reference to FIGS. 1 through 5. In certain examples, aspects of the operations of 1815 may be performed by a transmitter as described with reference to FIGS. 10 through 13.

Figure 19:
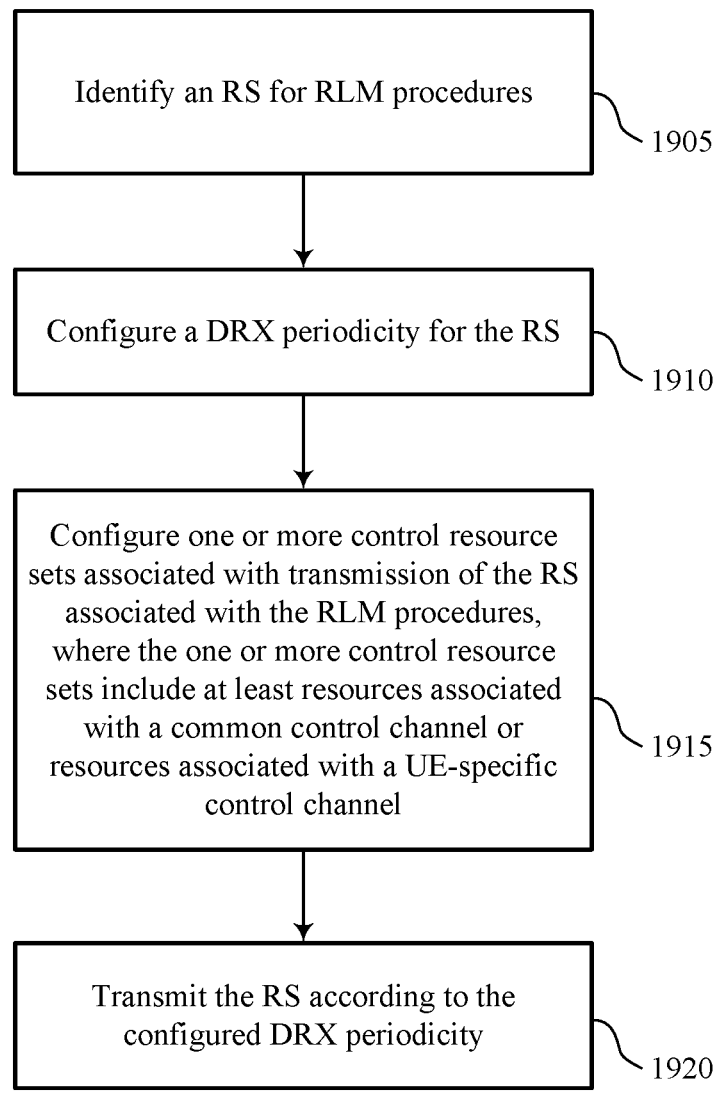

FIG. 19 shows a flowchart illustrating a method 1900 for RLM without always-on RSs in accordance with aspects of the present disclosure. The operations of method 1900 may be implemented by a transmitting device, such as a base station 105, or its components as described herein. For example, the operations of method 1900 may be performed by a base station RLM manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may identify an RS for a downlink control channel, where the RS is associated with RLM procedures. The operations of 1905 may be performed according to the methods described with reference to FIGS. 1 through 5. In certain examples, aspects of the operations of 1905 may be performed by a downlink RS component as described with reference to FIGS. 10 through 13.

At 1910 the base station 105 may configure a DRX periodicity for the RS. The operations of 1910 may be performed according to the methods described with reference to FIGS. 1 through 5. In certain examples, aspects of the operations of 1910 may be performed by a DRX configuration manager as described with reference to FIGS. 10 through 13.

At 1915 the base station 105 may configure one or more control resource sets for transmission of the RS associated with the RLM procedures, where the one or more control resource sets comprise at least resources associated with a common control channel or resources associated with a UE-specific control channel. The operations of 1915 may be performed according to the methods described with reference to FIGS. 1 through 5. In certain examples, aspects of the operations of 1915 may be performed by a control resource set manager as described with reference to FIGS. 10 through 13.

At 1920 the base station 105 may transmit the RS according to the configured DRX periodicity. The operations of 1920 may be performed according to the methods described with reference to FIGS. 1 through 5. In certain examples, aspects of the operations of 1920 may be performed by a transmitter as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE) comprising:
a processor, the processor comprising a combination of intelligent hardware devices;
memory coupled with the processor; and
one or more instructions stored in the memory and executable by the processor to cause the apparatus to, based at least in part on the one or more instructions:
receive an indication of discontinuous reception (DRX) configuration comprising a DRX periodicity associated with transmission windows, the transmission windows being based on the DRX periodicity; for a reference signal (RS) used for a radio link monitoring (RLM) procedure, the RS being within a transmission window of the transmission windows;
the RLM procedure being based detecting the RS in the transmission window and, and based on monitoring outside of the transmission windows;
perform the RLM procedure.

* * * * *